US008572079B2

(12) United States Patent
Bachman et al.

(10) Patent No.: US 8,572,079 B2
(45) Date of Patent: Oct. 29, 2013

(54) COLLABORATIVE LINKING SYSTEM WITH BI-DIRECTED VARIABLE GRANULARITY SEARCH ENGINE

(75) Inventors: Jonathan A. Bachman, Wellesley, MA (US); Christopher J. Sole, Newton, MA (US)

(73) Assignee: Placelinks, Inc., Wellesley, MA (US)

( * ) Notice: Subject to any disclaimer, the term of this patent is extended or adjusted under 35 U.S.C. 154(b) by 0 days.

(21) Appl. No.: 12/777,033

(22) Filed: May 10, 2010

(65) Prior Publication Data

US 2011/0161418 A1    Jun. 30, 2011

Related U.S. Application Data

(66) Continuation of application No. 10/204,288, Substitute for application No. PCT/US01/04877, filed on Feb. 16, 2001, now Pat. No. 7,734,570.

(60) Provisional application No. 60/182,749, filed on Feb. 16, 2000.

(51) Int. Cl.
    *G06F 17/30* (2006.01)
(52) U.S. Cl.
    USPC ........................................ 707/736; 705/14.14
(58) Field of Classification Search
    None
    See application file for complete search history.

(56) References Cited

U.S. PATENT DOCUMENTS

| 5,893,091 | A  | * | 4/1999 | Hunt et al. | 1/1 |
| 7,184,971 | B1 | * | 2/2007 | Ferber | 705/14.16 |
| 2001/0039513 | A1 | * | 11/2001 | Erlichson et al. | 705/14 |
| 2005/0075932 | A1 | * | 4/2005 | Mankoff | 705/14 |

OTHER PUBLICATIONS

Ken Evoy, M.D., How to Listed in Yahoo, Web Marketing Today, Issue 54, Mar. 1, 1999; http://www.wilsonweb.com/wmt4/990301yahoo.htm.*

* cited by examiner

*Primary Examiner* — Belinda Xue
(74) *Attorney, Agent, or Firm* — Pierce Atwood LLP; Joseph M. Maraia

(57) ABSTRACT

The present invention is a system and method for shortening response time and reducing resource utilization in an electronic advertising and customer enquiry system, operating in an interactive communications and distributed database environment. The system is designed to enable customers (01) to easily find product and service offerings that match their requirements for immediate local accessibility (A1), as well as the customer's (01) specific product desires. Where a perfect match does not exist, slightly less satisfactory solutions are offered. Such product offerings and customer (01) desires have static and dynamic characteristics that effect their electronic publication, enquiry, matching, and subsequent response.

30 Claims, 29 Drawing Sheets

Welcome to PlaceLinks

Place ◯ Links ⟩

Intensely Local Shopping Search and Offers
Welcome to PlaceLinks, the perfect place to search for things you buy, as close as possible to where you live and work. We link you up with the best you can find in your place!

- PlaceLinks has easy local search to help you find brands, products, activities and stores near you.
- PlaceLinks gets you the best local promotions and coupons to help you save money and find exciting new things to try.
- Try FREE PlaceLinks Mailer news service to bring you timely news about your favorite brands and stores.

Receive Favorites
PlaceLinks Mailer is your own Free shopping news service.
Sign Up Here

20% Off Broadband Access
MediaOne offers 20% off broadband Internet access to PlaceLinks users!

$1 Million Sweepstakes
Try a new magazine - and enter to win the $1,000,000 Sweepstakes.
Publishers House Where are you?
Town: [        ]  State: [MA ▾]  Zip: [    ]
[Go!]

Want to take the 30 second tour of what you can do? Click here.

Find a business or product – a new approach to the Yellow Pages

Sign up for the top coupon offers in your town.

Privacy policy | Advertise with PlaceLinks | Company Information | Terms of Service
© 1999 PlaceLinks

FIG. 17

Wellesley, MA

Four Ways to Search

1. By Keyword
Search: [        ] Go!
Try entering business name, brand, product, activity or other keywords

2. By Categories
Appliances (12)        Office (9)
Automotive (22)       Parties (5)
Banking (8)           Pets (18)
Beauty (14)           Professionals (73)
Clothing (17)         Real Estate (16)
Electronics (15)      Recreation (23)
Entertainment (26)    Schools (5)
Florists (8)          Stores (62)
Food (54)             Travel (44)
Home Interior (9)     Utilities (8)
Insurance (13)        Weddings (14)
Lawn & Garden (4)
Medical (49)
                      More Categories...

3. By Businesses Names
A B C D E F G H I J K L M N O P Q R S T U V W X Y Z

4. By Special Offers
Brands: Delta, Izod, Sony
Products: China, Fish, Gas, Kids Clothing, Pizza, TV
Activity: Cleaning, Soccer Need Help Searching?

Return to Start | About PlaceLinks Wellesley | About PlaceLinks
© 1999 PlaceLinks CChange Place ( Place )   Links  >

Receive Favorites
PlaceLinks Mailer is your own Free shopping news service.
Sign Up Here

Pizza and Soda for $8.99
Medium 1-Topping Pizza and 2-liter soda $8.99 plus tax. Domino's, Wellesley, 781-235-0020

Free Cleaning
Receive a Free Cleaning* when you sign up for our weekly or bi-weekly service. *Two month minimum. Call for details. MaidPro, Wellesley/Needham, 781-235-3900

$5 Off Dry Cleaning
$5.00 OFF Any Incoming Dry Cleaning Order of $25 or More. One per visit. Jaylin Cleaners, Wellesley

FIG. 18

| Wellesley, MA | | CChange Place | Place | Links |
| --- | --- | --- | --- | --- |

Six Ways to Continue Your Search

1. Select a Business

| | | |
| --- | --- | --- |
| Same Day Service Co. | Newton | 617-965-0775 |
| Best Repair Service | Newton | 617-969-1919 |
| Newton Appliance | | |
| Same Day Service | Newton | 617-558-5500 |
| Poirier Sales & Service Corp | | |
| Widest Selection | | |
| Same Day Service Co. | Newton | 617-244-4944 |
| Daddario J D Co Inc. | Newton | 617-630-0100 |
| Dependable Appliance Service | Newton | 617-558-9997 |
| Commonwealth | Brookline | 617-731-1800 |
| Maytag-Newton Appliance Service | Newton | 617-969-1919 |
| Sears Appliance Repair | Natick | 800-469-4663 |
| KC Appliance | Needham | 781-444-4707 |
| Ryan Appliance | Needham | 781-444-0408 |
| Brookline Appliance Center, Inc. | Newton | 617-527-4840 |
| Flynn's Appliance Repair | Newton | 617-965-0597 |
| Affordable Appliance | Wellesley | 781-237-2553 |
| Javos Hotpoint Appliances | Wellesley | 781-235-5112 |

Order By: Alphabet, Category, Proximity, Offer

2. Select a Brand
Amana, Asko, Asea, Bosch, Caloric, Carrier, Dacor, Frigidaire, Gaggenau, GE, GE/Hotpoint, Insinkerator, Jenn-Air, Kenmore, Kitchenaid, Maytag, Miele, Modern Maid, Russell, Sears, Subzero, Tappan, Thermador, Traulsen, Viking Professional, Whirlpool 3. Select a Product
Air Conditioner, Compactor, Dishwasher, Disposal, Dryer, Electric Stove, Freezer, Gas Stove, Microwave Oven, Oven, Range, Refrigerator, Room Air Conditioner, Stoves, Washer 4. Select an Activity
Kitchen Design 5. Enter Qualifying Keywords
Search: [____] Go!
Try entering business name, brand, product, activity or other keywords 6. Expand search to Neighboring towns, or move to Dover, Natick, Needham, Weston Return to Start | About PlaceLinks Wellesley | About PlaceLinks ©1999 PlaceLinks
Portions ©1999 Acxiom.

---

Receive Favorites
PlaceLinks Mailer is your own Free shopping news service.
Sign Up Here

Best Repair Service
We provide free service call when we repair, Exact written quotes, 3,000 parts stocked on every truck, All competitor coupons accepted, Over 90% of Appliances repaired on the same day, and a Seniors Discount. Same Day Service Co. Inc.

Same Day Service
Authorized Maytag and In-Sink-Erator Sales & Same Day Service. Newton Appliance

Widest Selection
Visit our Newton Or Norwood Showrooms to view the wide selection of major appliances and repair parts.
Poirier Sales & Service

Advertise on this Page

FIG. 19

Wellesley, MA    CChange Place         Place  Links>

Six Ways to Continue Your Search

1. Select a Business

Commonwealth                          Brookline 617-731-1800

Order By: Alphabet, Category, Proximity, Offer

2. Select a Brand
Amana, Asko, Asea, Bosch, Caloric, Carrier, Dacor, Frigidaire, Gaggenau, GE, GE/Hotpoint, Insinkerator, Jenn-Air, Kenmore, Kitchenaid, Maytag, Miele, Modern Maid, Russell, Sears, Subzero, Tappan, Thermador, Traulsen, Viking Professional, Whirlpool 3. Select a Product
Air Conditioner, Compactor, Dishwasher, Disposal, Dryer, Electric Stove, Freezer, Gas Stove, Microwave Oven, Oven, Range, Refrigerator, Room Air Conditioner, Stoves, Washer 4. Select an Activity
Kitchen Design 5. Enter Qualifying Keywords
Search: [         ] Go!
Try entering business name, brand, product, activity or other keywords 6. Expand search to Neighboring towns, or move to Dover, Natick, Needham, Weston Return to Start | About PlaceLinks Wellesley | About PlaceLinks
©1999 PlaceLinks
Portions ©1999 Aexiom.

Receive Favorites
PlaceLinks Mailer is your own Free shopping news service.
Sign Up Here

Electricians
Experienced electricians in Wellesley,
Cedrone Electric

Architects
We design additions and homes.
American Architectural

Advertise on this Page

FIG. 20

Wellesley, MA
and Dover, Natick, Needham, Weston

CChange Place

Place ) Links>

Receive Favorites
PlaceLinks Mailer is your own Free shopping news service.
Sign Up Here

1999 Freezer Savings
Buy a Miele Freezer for 20% off before Thanksgiving and we will buy the turkey!
Waltham Appliance Service Advertise on this Page

Six Ways to Continue Your Search

1. Select a Business

| | | |
|---|---|---|
| Commonwealth | Brookline | 617-731-1800 |
| Framingham Appliance | Framingham | 508-655-1485 |
| Waltham Appliance Service | Waltham | 781-891-0896 |

Order By: Alphabet, Category, Proximity, Offer

2. Select a Brand
Amana, Asko, Asea, Bosch, Caloric, Carrier, Dacor, Frigidaire, Gaggenau, GE, GE/Hotpoint, Insinkerator, Jenn-Air, Kenmore, Kitchenaid, Maytag, Miele, Modern Maid, Russell, Sears, Subzero, Tappan, Thermador, Traulsen, Viking Professional, Whirlpool 3. Select a Product
Air Conditioner, Compactor, Dishwasher, Disposal, Dryer, Electric Stove, Freezer, Gas Stove, Microwave Oven, Oven, Range, Refrigerator, Room Air Conditioner, Stoves, Washer 4. Select an Activity
Kitchen Design 5. Enter Qualifying Keywords
Search: [        ] [Go!]
Try entering business name, brand, product, activity or other keywords 6. Expand search to Neighboring towns, or move to Dover, Natick, Needham, Weston Return to Start | About PlaceLinks Wellesley | About PlaceLinks
©1999 PlaceLinks
Portions ©1999 Aexiom.

FIG. 21

Newton, MA                                    CChange Place

Place | Links >

PlaceLinks Mailer
Add this business to your favorites.

Back to last result

E-mail to a friend | Print friendly version | Add to Favorites

Business Listing
    Waltham Appliance Service
    781-891-0896
    101 Moody
    Waltham, MA 02833
    Email: buster@walthamappliance.com
    Web: www.walthamappliance.com
Categories
    Appliances
Active Promotions
    1999 Freezer Savings
Business Details
    Hours: 8-5 pm
    Brands: Miele
    Products: Dishwasher, Freezer
Navigation
    See a map
    Get directions
    Businesses on Moody Street
    Businesses in this Category or Industry Back to last result

Clear Search and Start Again

1999 Freezer Savings
Buy a Miele Freezer for 20% off before Thanksgiving and we will buy the turkey!
Waltham Appliance Service

Miele Web Site
Miele - Homepage of Miele, manufacturing a wide range of products from washing machines to vacuum cleaners, with product and company info.

Return to Start | About PlaceLinks Wellesley | About PlaceLinks

©1999 PlaceLinks
Portions ©1999 Aexiom.

FIG. 22

Shop at Your Store and Save up to 25%
Visit our Wellesley Store
at JCPenney's Biggest Sale of the Year!
Use Promotional Code "CSBIG"

JCPenney ( Place ) Links>

PlaceLinks Mailer Message

Dear Jonathan

Here's your chance to get 25% off apparel, shoes, bath, window, home decor, adult and juvenile bedding, or luggage.*

Your Biggest Sale Promotional Code is "CSBIG"
(Please write it down for later use or simply print out this page.)

Click here to begin shopping! Remember to enter Promotional Code "CSBIG" on the Shopping Bag page to receive your savings.

Print Brushed Cotton Jersey Tees $20-$22

Levi's Docker Jacket $250-$270

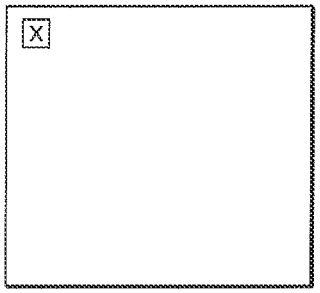
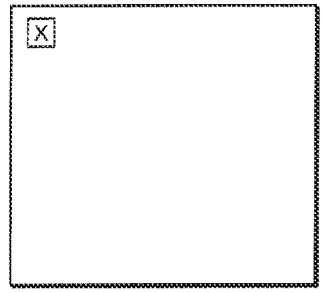

Or Save 15% on toys, electronics, furniture, sporting goods, or baby bedding and accessories!*

Click here to begin shopping! Remember to enter Promotional Code "CSBIG" on the Shopping Bag page to receive your savings.

Casio(R) Hand-held Color TV $99.99

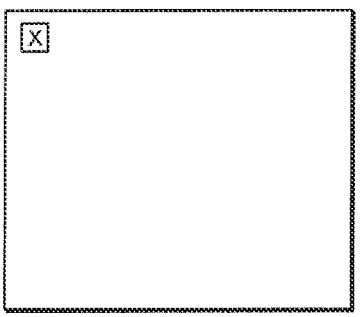

FIG. 23A

Use Promotional Code "CSBIG" to save when you shop from our Online Store, or using our EOB (Electronic Order Blank), order from The Fall/Winter "99 Big Book(TM), The JCPenney Big Gift Book(TM). JCPenney "Signature Series" Catalogs (Including Big & Tall Men, Women's Sizes 16W & Up, Tall Women, "J" for Style, Fashion Influences, Kids Book, and Window Authority).

Here's how it works:
* After you finish shopping, enter "CSBIG" in the Promotional Code Box at the bottom of the Shopping Bag page.
* Proceed with Checkout.
* Your applicable discount will be reflected in your pricing on the Order Checkout page.

The Biggest Sale only lasts through November 10, 1999, so order now!

*Offer valid on orders placed 11/1-11/10/99 from our on-line store, the JCPenney Fall/Winer '99 Big Book(TM) and JCPenney "Signature Series" catalogs. Discount applies to regular prices and not "2-or-more" reduced prices, and includes catalog and internet orders from eligible catalogs on advertised lines of merchandise. Discounts do not apply to Value Right Merchandise, Cookware & Small Kitchen Electrics, Catalog Jewelry, Video Games & Equipment, Floor Care, Aerosoles(R), Easy Spirit(R), Evan Picone(R), Hanes(R), FUBU, JNCO(R), Royal Velvet(R) by Fieldcrest(R), Sealy(R), Crown Jewel(R), Bose(R), Whirlpool(R), or in combination with any other JCPenney discount offer. This discount may not be used to purchase Gift Certificates or Membership Services and may not be applied to orders already placed. Offer good through 11/10.99.

-Your Friends at PlaceLinks.com

---

Visit PlaceLinks Today. Thank you for your interest in PlaceLinks.

If you feel you have received this message in error, or if you no longer wish to receive reminders, please forward this message to mailto:remove@PlaceLinks.com ( Place ) Links>

FIG. 23B

PlaceLinks Mailer

Sign up to get email about your favorite stores, brands, product categories and activities. Then value ideas will start to arrive by email. You can stop or change at any time. PlaceLinks matches your interests with those stores or brands - so you get the lates news and the very best values.

How to Get Started with PlaceLinks Mailer
Think about the most favorite brands or stores you have. About hot shopping activities that you need to get done (a vacation, a birthday present, a new child). Or about favorite hobbies (dancing, football games, collecting). Give PlaceLinks Mailer your email address, and some news will start to arrive. Be as specific as possible.

Email privacy policy

Examples:
    Reebok-*Local*
    Estee lauder-*City*
    MTV-*Nation*

Your Top Stores
    [ ]    Local  City  Nation
    [ ]    Local  City  Nation

Your Top Brands
    [ ]    Local  City  Nation
    [ ]    Local  City  Nation

Your Top Products
    [ ]    Local  City  Nation
    [ ]    Local  City  Nation

Your Top 3 Activities
    [ ]
    [ ]
    [ ]

[Continue]

( Place )  Links>

Return to Start | About PlaceLinks Wellesley | About PlaceLinks
©1999 PlaceLinks
Portions ©1999 Aexiom.

FIG. 24

COLLABORATIVE LINKING SYSTEM WITH BI-DIRECTED VARIABLE GRANULARITY SEARCH ENGINE

CROSS REFERENCE TO RELATED APPLICATIONS

This application is a continuation of U.S. patent application Ser. No. 10/204,288, filed Aug. 16, 2002, now U.S. Pat. No. 7,734,570 which is a National Stage entry of International Patent Application Serial Number PCT/US01/04877, filed Feb. 16, 2001, which claims benefit of priority from U.S. Provisional Patent Application Ser. No. 60/182,749, entitled Collaborative Linking System with Bi-directed Variable Granularity Search Engine, filed Feb. 16, 2000, all incorporated herein by reference in their entireties.

FIELD OF THE INVENTION

Generally, the present invention relates to networked computer systems. More specifically, the present invention relates to computer systems and search engines used to selectively link members from any of a plurality of classes of users via any of a plurality of network enabled, wired or wireless, computers (or electronic devices).

BACKGROUND OF THE INVENTION

Internet usage has become immense and promises to be much larger in the amount of information stored and made available to it users. In fact, the quantity of accessible information content and the number of requests for information are growing much more rapidly then the ability to deliver the desired information. This delivery is limited by the power of the available processors, database machines, and communication bandwidth available and limited by the ability of the humans and their local computers (or electronic devices) to receive and process the data returned. Considerable research has been carried out to create more efficient search engines that attempt to minimize the actual data access, data communications, and querying required to satisfy the user's real need.

The great thrust of the Internet is characterized by the thrust of the "World Wide Web," suggesting that all of the information stored, worldwide, can be accessed by all of the users, worldwide via increasing numbers and types of wired or wireless computers, such as workstations, personal computers, cell phones, pagers, and personal organizers, just to name a few. Research, applications, and usage have been concentrated on this worldwide accessibility, such that the reach and access of a Web user seems limitless.

However, with the apparent focus on increasing a user's reach and access to volumes of data, the Internet and World Wide Web, at times, is a forum of scarcely tapped potential on a community level. That is, consumers and product and service providers have realized only marginal benefits from the Web in their mutual conduct of community level business transactions.

It is believed that as much as 85% of a consumer's purchases occur within 20 miles of the consumer's residence. Yet, presently, the Web does not link local consumers with local providers of goods and services in a scalable and efficient manner.

SUMMARY OF THE INVENTION

The present invention is a network-based collaborative linking system having bi-directed, variable granularity search engines configured to selectively link one or more members from a first class of users with one or more members from at least one other class of users. Each class member may interact with the collaborative linking system using a wired or wireless computer. Wherein, the word "computer" as used herein is to include, but is not limited to, those wireless devices, like cell phones, personal organizers, and pagers, which are network enabled and which allow their users (or class members) to interact with a network to send and receive messages, for example. In the case of pagers and personal organizers (i.e., receive only devices), it may be used to receive solicited or unsolicited advertisements, or announcements or e-mail with limited text, as an example. However, for the most part, messages may be include text, graphics (static and dynamic), or audio information, or some combination thereof.

In its simplest form, the collaborative linking system links members of a first class with members of a second class, wherein members of the second class generally seek information or data from members of the first class. Also, members of the first class may seek and use certain information related to members of the second class to facilitate more efficient and focused information providing. Each class may be generally characterized according to the application for which the collaborative linking system is to be applied. For example, in an e-commerce application, all members of the first class may be characterized as "providers" and all members of the second class maybe characterized as "consumers".

The collaborative linking system may impose a general structure or framework on classes (e.g., consumers and providers), to facilitate efficient processing. Providers may selectively map their provider information into the framework and consumers may then search for provider information in a logical manner. By selectively mapping into certain areas of the collaborative linking system, a provider imposes a filter on its entry. From a consumer's perspective, by defining certain search criteria, within the context of the framework, the consumer defines a filter into the collaborative database for obtaining information. Given that the consumer can define and redefine his search criteria, the consumer can control the granularity of the search.

Within each class, members of that class may be grouped into subclasses, according certain criteria. Subclasses mayor may not be hierarchical. That is, a subclass is constructed in accordance with certain criteria. Other than the criteria that defines the class generally (e.g., all providers), the other criteria that defines one subclass may be independent of the criteria that defines every other subclass. For example, a subclass of providers selling pizza may be independent from a subclass of providers selling skateboards, but they may both be part of an independent subclass of providers targeting consumers under the age of 21 years old. However, in a hierarchical context, an auto dealer subclass may be further subclassified into certain makers of automobiles (e.g., Chevrolet, Ford, etc.). In most embodiments, the collaborative linking system will include some combination of independent and hierarchical subclassifying.

Consumers may be similarly subclassified, either independently, hierarchically, or some combination thereof. As an example, consumers may be independently subclassified into age groups, that is, age group 1, or age group 2, or age group 3, or "all ages", and independently, they may be subclassified as male, or female, or both. Generally, the criteria of providers correspond to the criteria of consumers, such that the more refined the criteria (or search criteria) of a consumer the smaller the solution set of providers that will satisfy the consumer's criteria. Similarly, the more refined the criteria (or search criteria) of a provider the smaller the solution set of consumers that will satisfy the provider's criteria.

Classes, and their members, may be defined in any of a variety of manners, as dictated by the application for which the collaborative linking system is to be used. A member may be an individual, an organization, or some other type of entity. Preferably, the collaborative linking system is a Web-based system implemented over the Internet for e-commerce purposes. However, the collaborative system may also be implemented with other types of networks, such as, for example, a wide area network (WAN), local area network (LAN), or Intranet of an organization or affiliation or some combination thereof, and need not be restricted to e-commerce. Additionally, classes and their members may have different system privileges and the system may employ various known security mechanisms.

The collaborative linking system includes a plurality of wired and/or wireless computers (e.g., workstations, personal computers (PCs), cell phones, pagers, electronic personal organizers, Web enabled television, or other such interactive electronic devices) linked to one or more content servers and content databases of provider, and potentially consumer, information. The provider database content may include relatively static data, as well as short-term "promotional" or time critical dynamic data that may be of interest to consumers. In the preferred form, a control center having one or more control servers and associated control databases, serves as an entry point for selectively distributing and managing the distribution of providers' data to the content servers and content databases. The control center also establishes and manages, to some degree, the high level framework within which the classes operate. In addition to provider and consumer databases that may be provided as part of the collaborative linking system, third party databases may be linked to the system and the data therein used to facilitate improved satisfaction of the objectives of the collaborative linking system. For example, third party databases including directory listings, maps, SIC codes, Zip codes, telephone exchange numbers, and/or directions for getting from one place to another may be linked to, or imported into, the collaborative linking system.

A collaborative linking system program code is executable by one or more of said content servers and includes one or more bi-directed, variable granularity search engines. A search engine facilitates searches of, for example, provider content databases according to consumer's defined filters (i.e., search criteria). Based on a first level of search criteria, the search engine determines the appropriate one or more content servers and associated content databases most likely to satisfy the user's search. By continuing to add search criteria, additional (or more refined) filters are applied by the search engine to the content databases; thus, the user's search is further refined.

The collaborative linking system includes a plurality of user interfaces (UI) to facilitate the interaction of each of several types of users and computers (e.g., PC, cell phone, or pager) with the system. Preferably, each UI is generated from program code executed within a standard Web browser, on a user's workstation or PC, but the actual UI implementation will often vary as a function of the type of device with which a user interacts with the collaborative linking system. Each UI may be established with specific user privileges, having different levels of access and security. For example, a system administrator UI (SAUI) is provided to facilitate the configuring and maintenance of the system. A developer's UI (DUI) may also be provided for initial development and integration of system components and for performing functions similar to those accomplished using the SAUI. Preferably the SAUI and DUI are part of the control center. The control center is, for the most part, a logical center of the system and mayor may not have all of its components physically collocated. Access to the control center may be local, remote, or some combination thereof, depending on the embodiment. In various embodiments, the collaborative linking system also includes UIs for billing and account management, which may be part of the SAUI or part of a separate UI.

A provider UI (PUI) may also be provided to allow each provider to directly add, modify, delete, and map the provider's information into the system's content servers and databases. As an alternative or a companion to the provider's direct entry, the system administrator may add, modify, delete, and map provider data into the system via the SAUI. Using the PUI a provider can also, preferably, establish a provider account on the collaborative linking system and take advantage of, for example, non-static information providing features of the system, such as, for example, offering specials to consumers.

To facilitate a consumer's interaction with the collaborative linking system, a consumer UI (CUI) is provided. The CUI facilitates a consumer's search for provider information by enabling the consumer to enter and create filters (i.e., search criteria) used to efficiently migrate through the collaborative linking system content servers and content databases to optimally locate relevant provider data, both static and dynamic. Screens displayed and information provided within the consumer's Web browser are a function of the framework, the providers' mapping of data into the framework, and the consumer's search criteria. Where appropriate, the UI screens generated by the collaborative linking system may include Web site and e-mail links.

A consumer may optionally enter consumer information into the collaborative linking system via the CUI and avail himself of an automatic linking capability that links providers and consumers as a function of a certain amount of synergy between the two. For example, the consumer's information may indicate that the consumer is an avid hiker and as local providers offer specials on hiking (or related) equipment, those providers and their specials are automatically identified to the consumer (e.g., via e-mail). Additionally, the collaborative linking system may selectively link consumers and providers using information obtained about the consumer's purchasing practices (or using other consumer related information), such that the consumer receives unsolicited provider promotional announcements. Preferably, a consumer may opt out of the distribution of unsolicited provider promotional announcements.

As will be appreciated by those skilled in the art, the various user interfaces may vary depending on the particular type of computer used. For example, the CUI for a PC may differ from the CUI for a cell phone, which may also differ from the CUI of an electronic organizer, and so on. Differences may be realized for each type of UI, among various types of computer devices.

BRIEF DESCRIPTION OF THE DRAWINGS

The foregoing and other objects of this invention, the various features thereof, as well as the invention itself, may be more fully understood from the following description, when read together with the accompanying drawings, described:

FIGS. 17-24 are screen display diagrams of the user interface of the collaborative linking system of FIGS. 1-16.

For the most part, and as will be apparent when referring to the figures, when an item is used unchanged in more than one figure, it is identified by the same alphanumeric reference indicator in all figures.

Trademarks of various entities are used herein as examples and do not indicate any specific relationship to the present invention. The trademarks used herein remain the property of their respective owners and nothing herein is intended to alter those property rights.

DETAILED DESCRIPTION OF THE PREFERRED EMBODIMENTS

In the preferred form, the collaborative linking system is applied in a Web-based e-commerce context. In such a context, a first class of users includes "providers", having members that include a plurality of retailers, service providers, restaurants, and so on. For the most part, in the preferred embodiment, a provider may be any type of entity found in a typical Yellow Pages phone book, for example. A second class of users includes "consumers", having members that include individuals, businesses, and so on. Preferably, providers and consumers interact with the collaborative linking system via any of a variety of wired or wireless types of computers (e.g., workstations, personal computers (PCs), cellular telephones, pagers, electronic personal organizers, Web enabled televisions, or other types of electronic devices).

Figure 1:
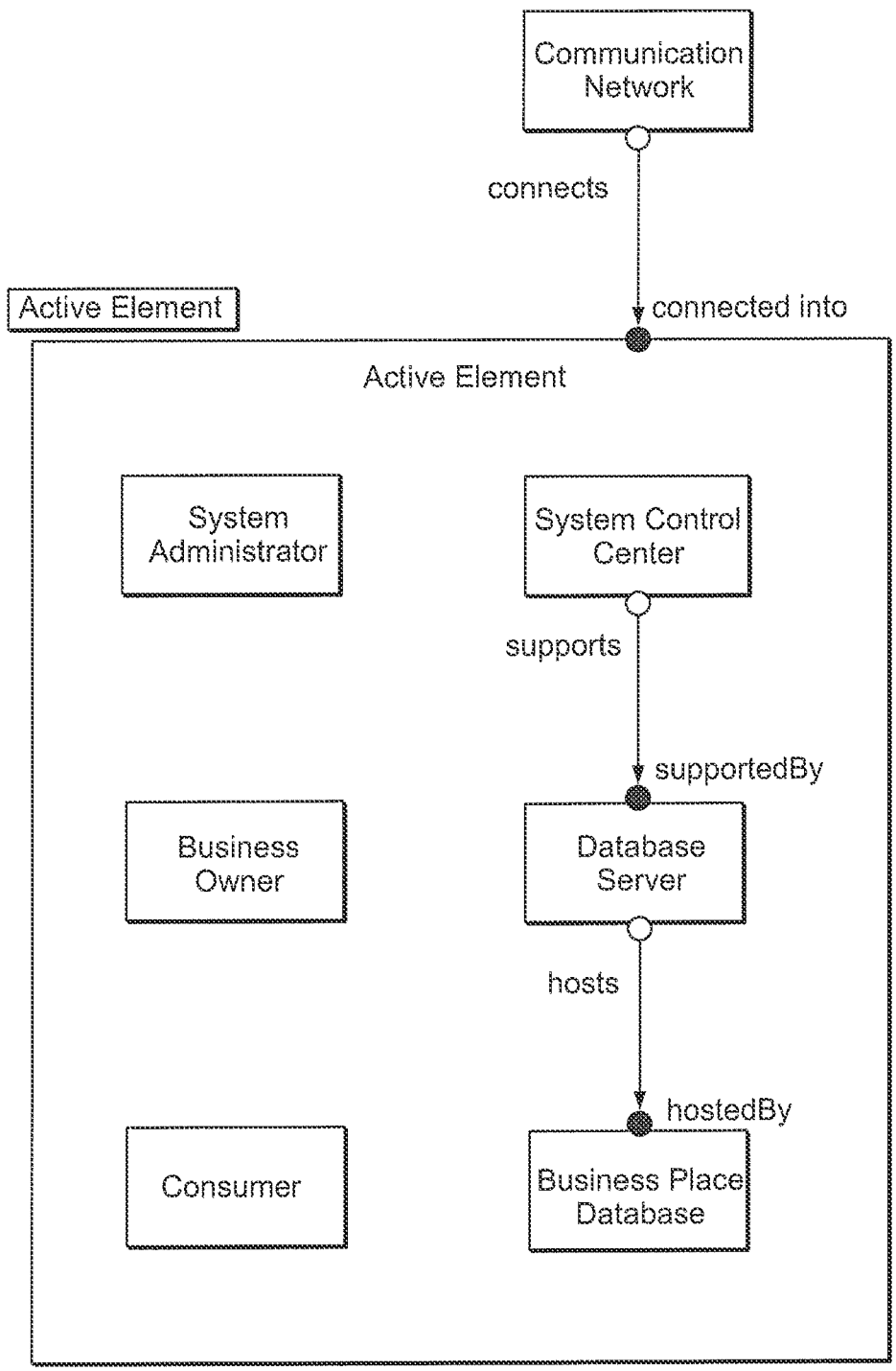
FIGS. 1-10B are diagrams illustrating the entity types and relationships of the preferred embodiment of a collaborative linking system, in accordance with the present invention.
Figure 2:
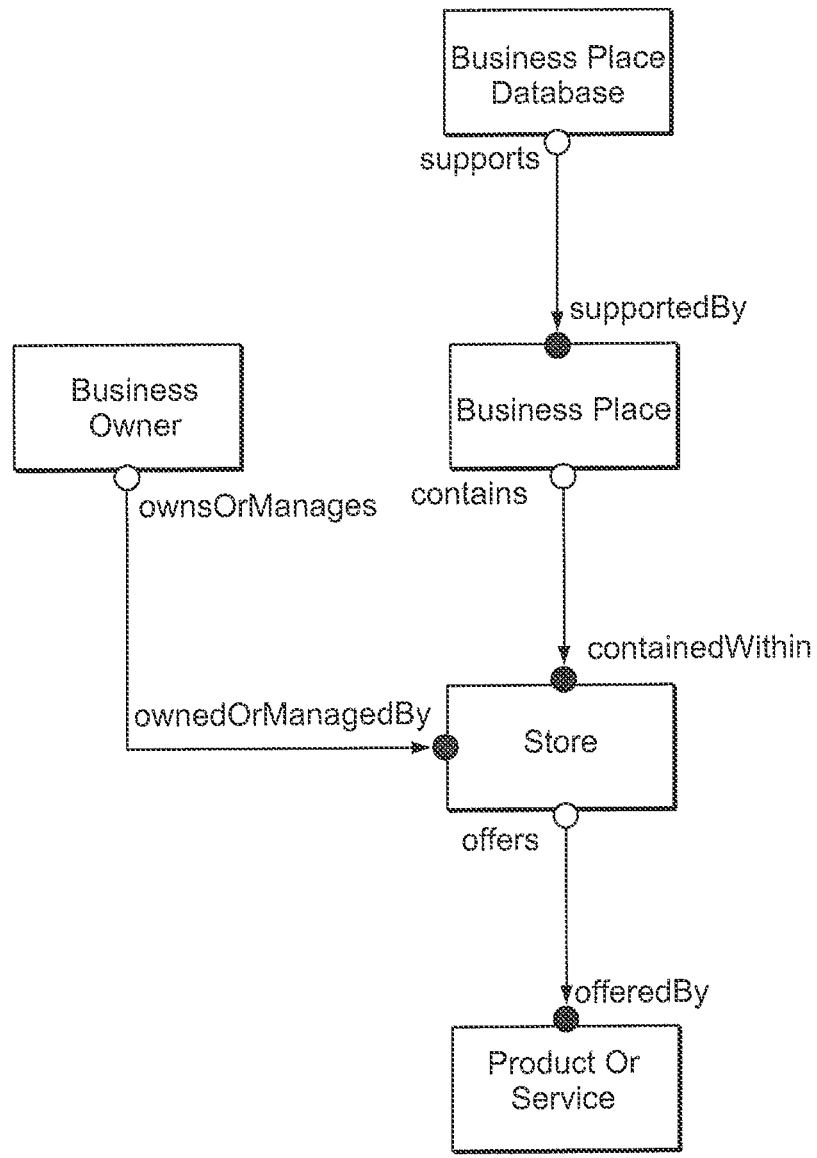
Figure 3:
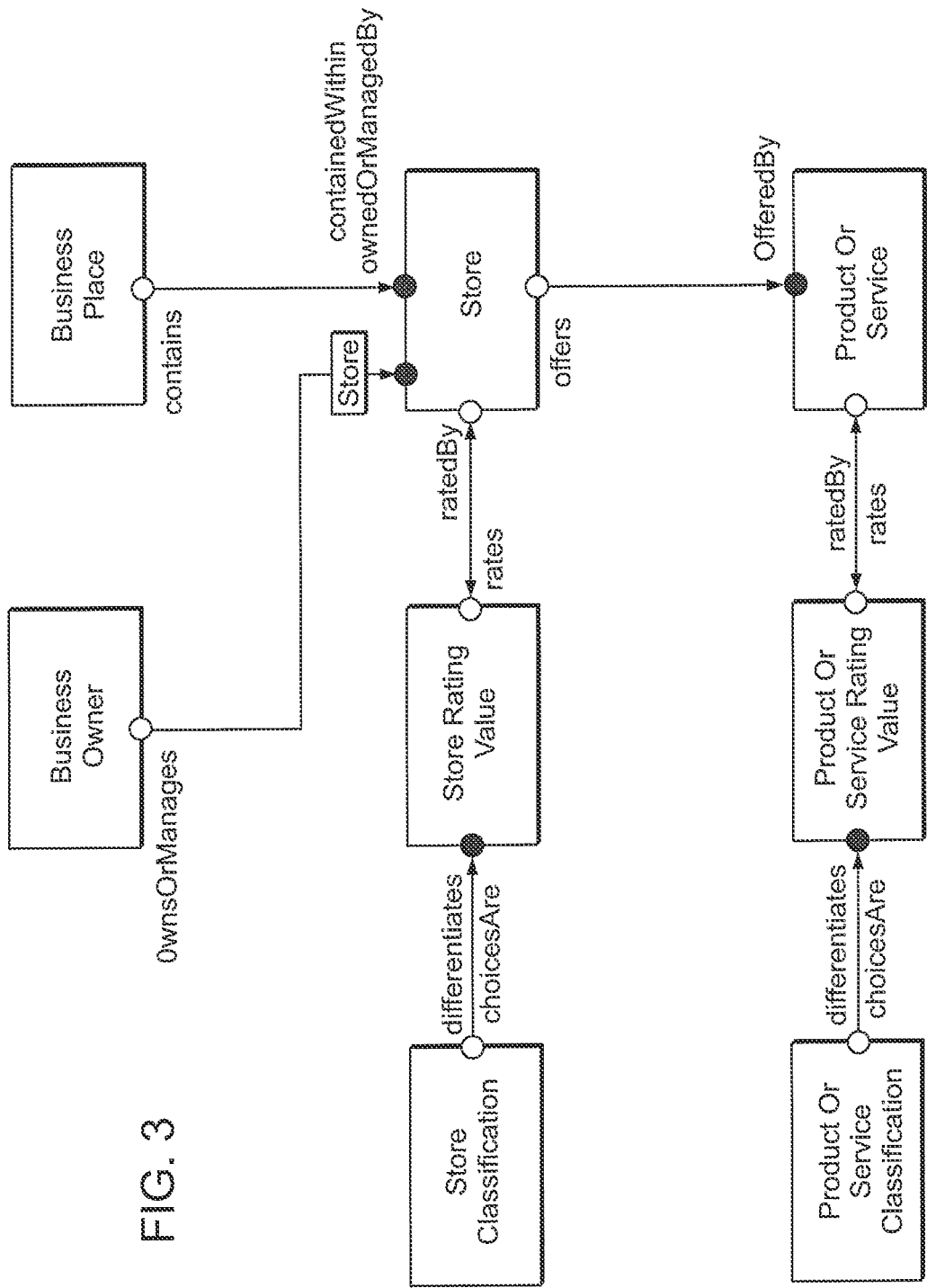
Figure 4:
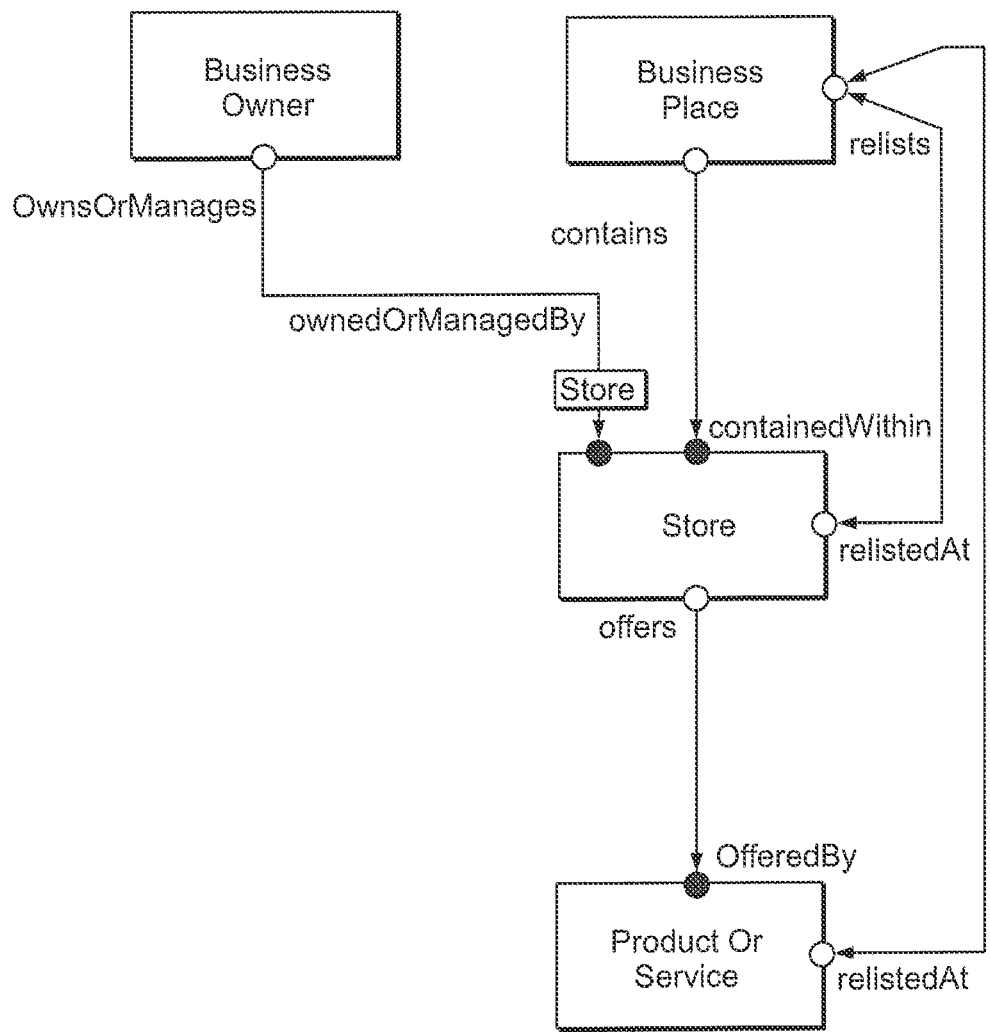
Figure 5:
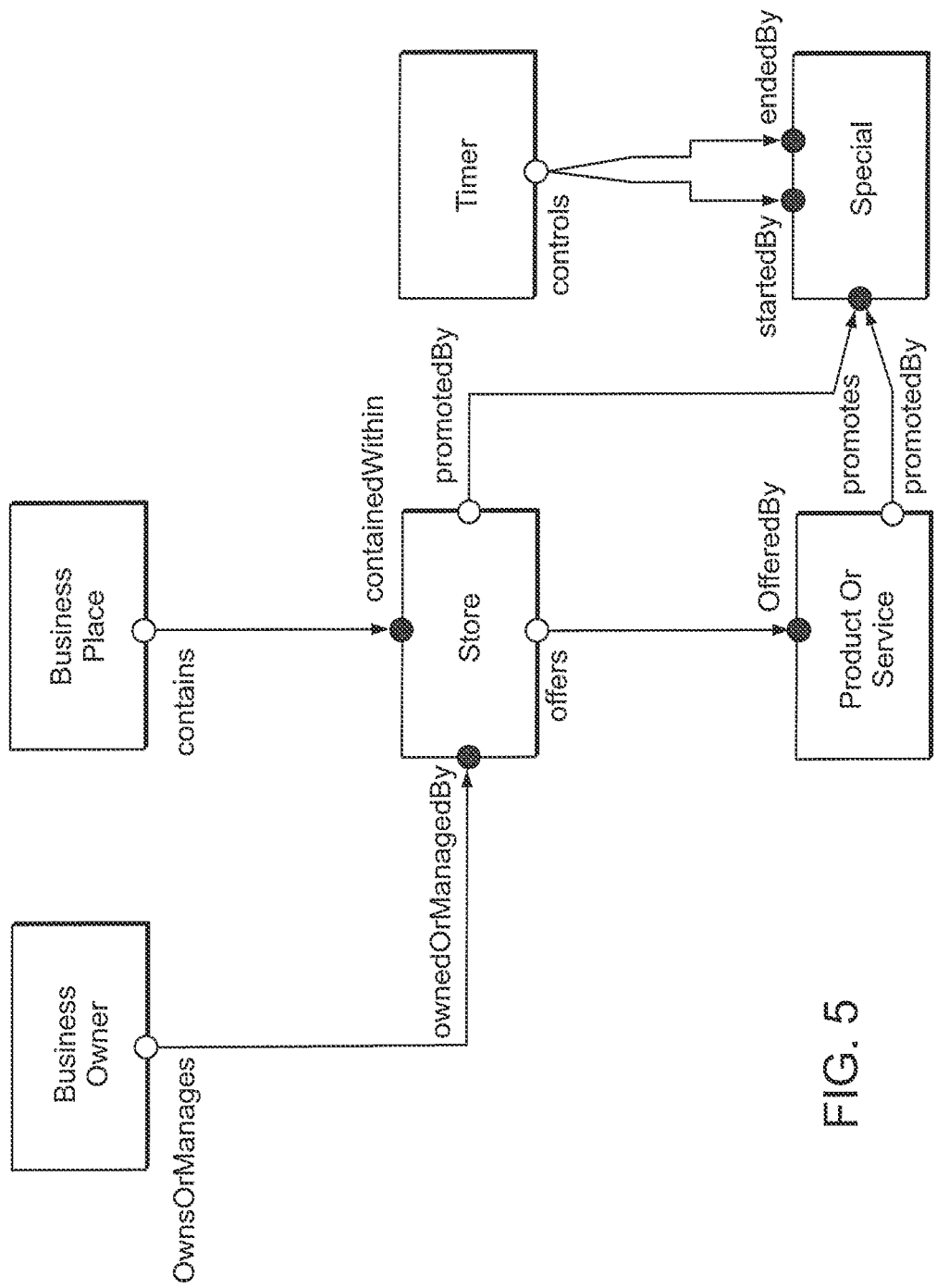
Figure 6:
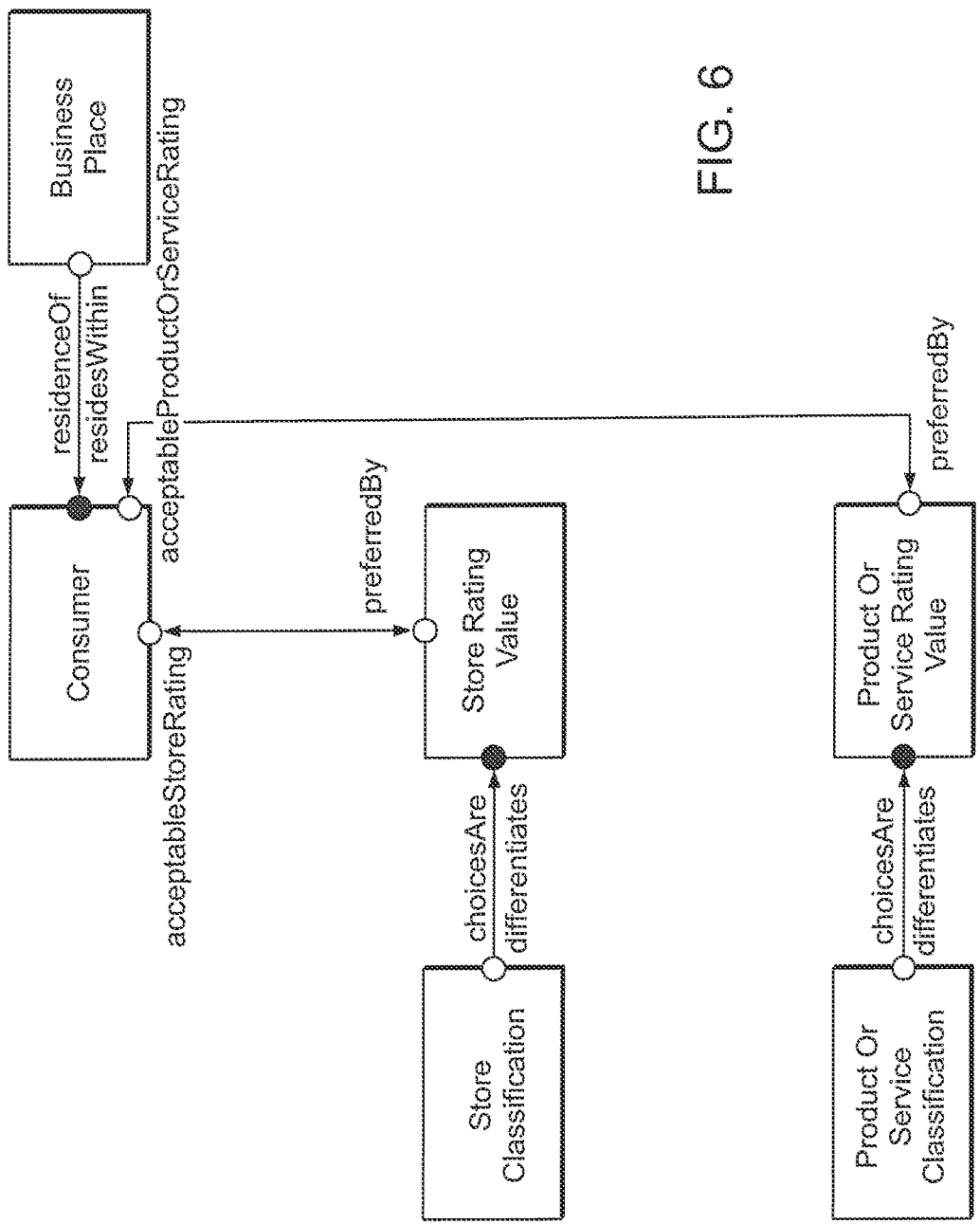
Figure 7:
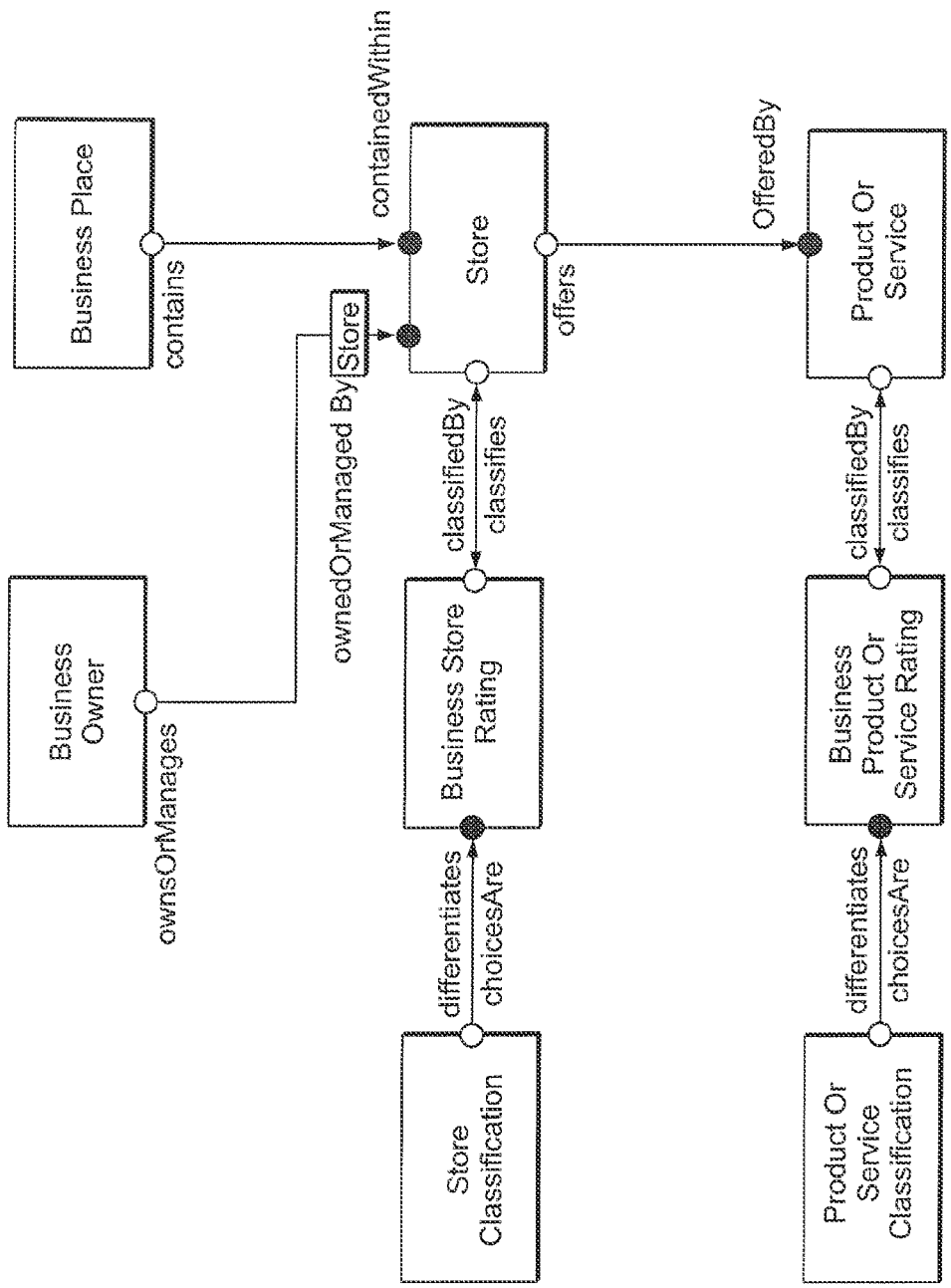
Figure 8:
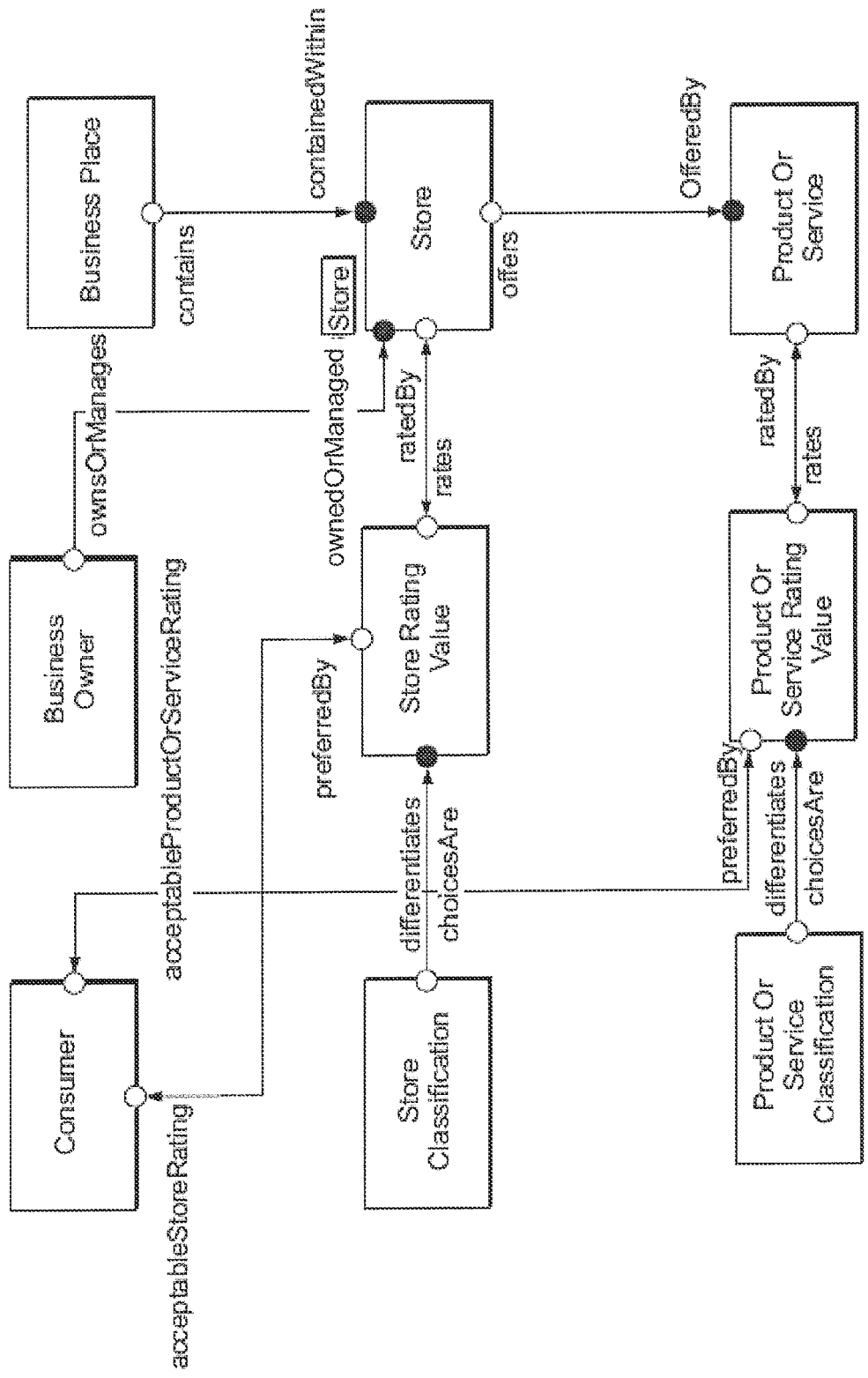
Figure 9:
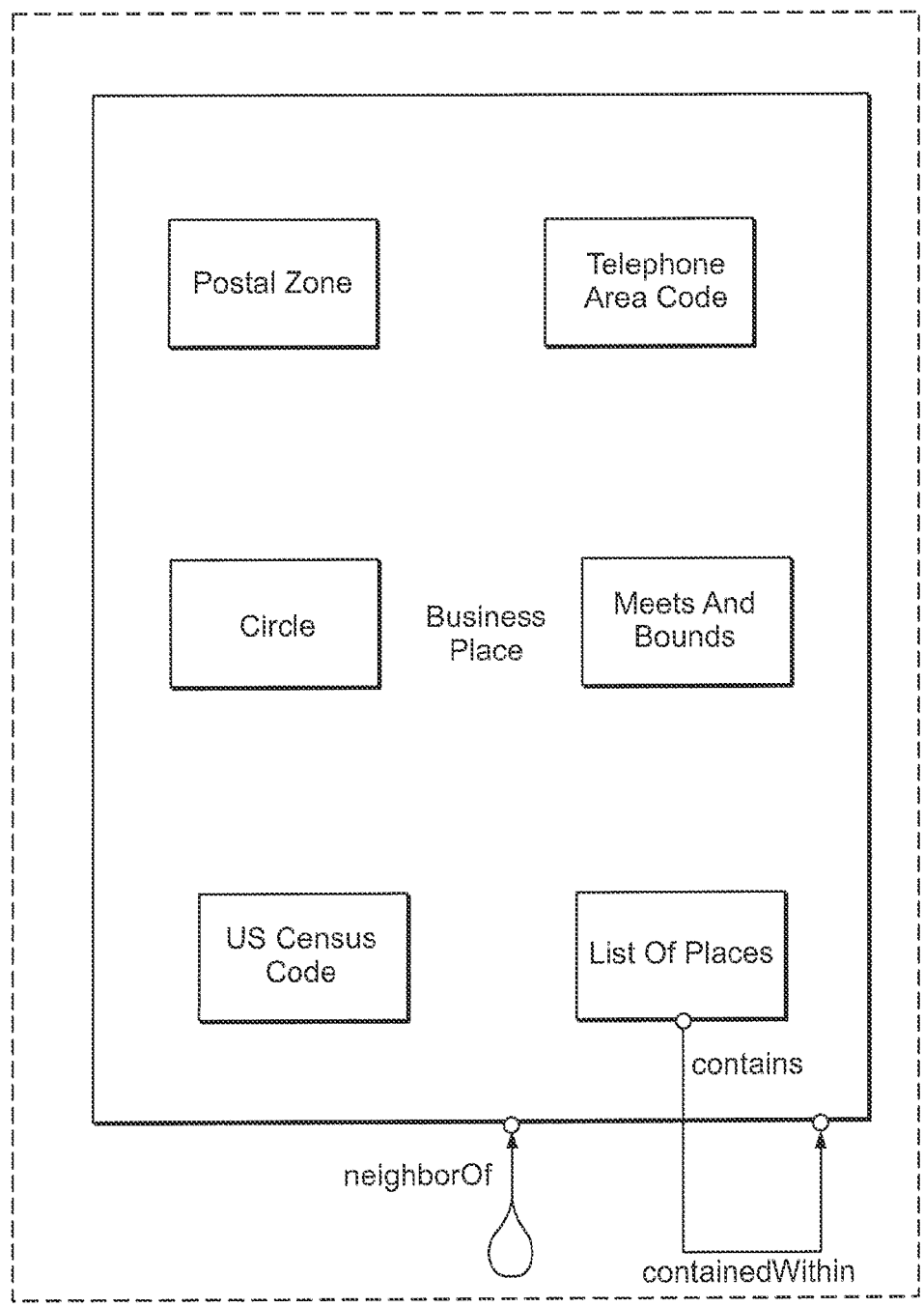
Figure 10A:
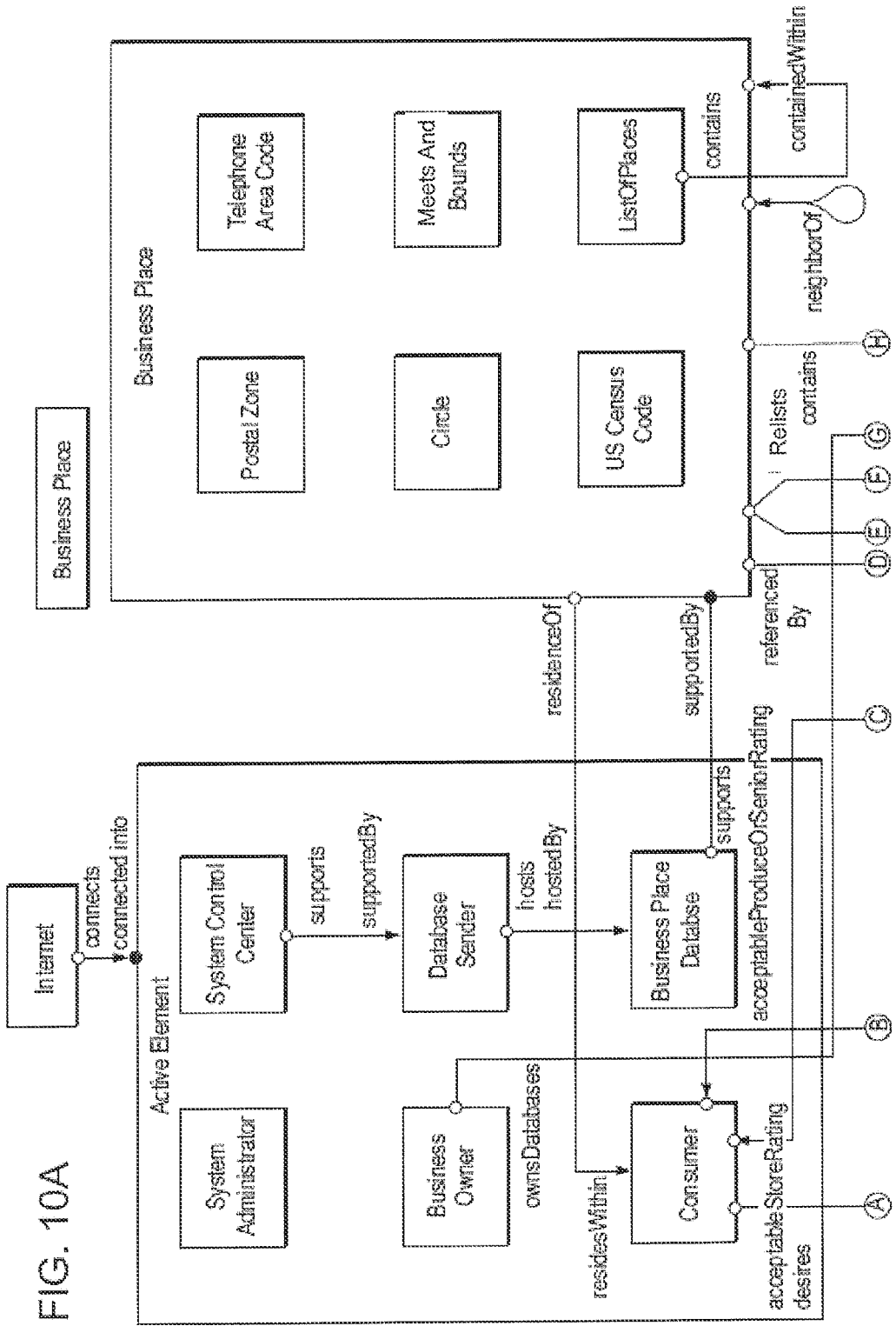
Figure 10B:
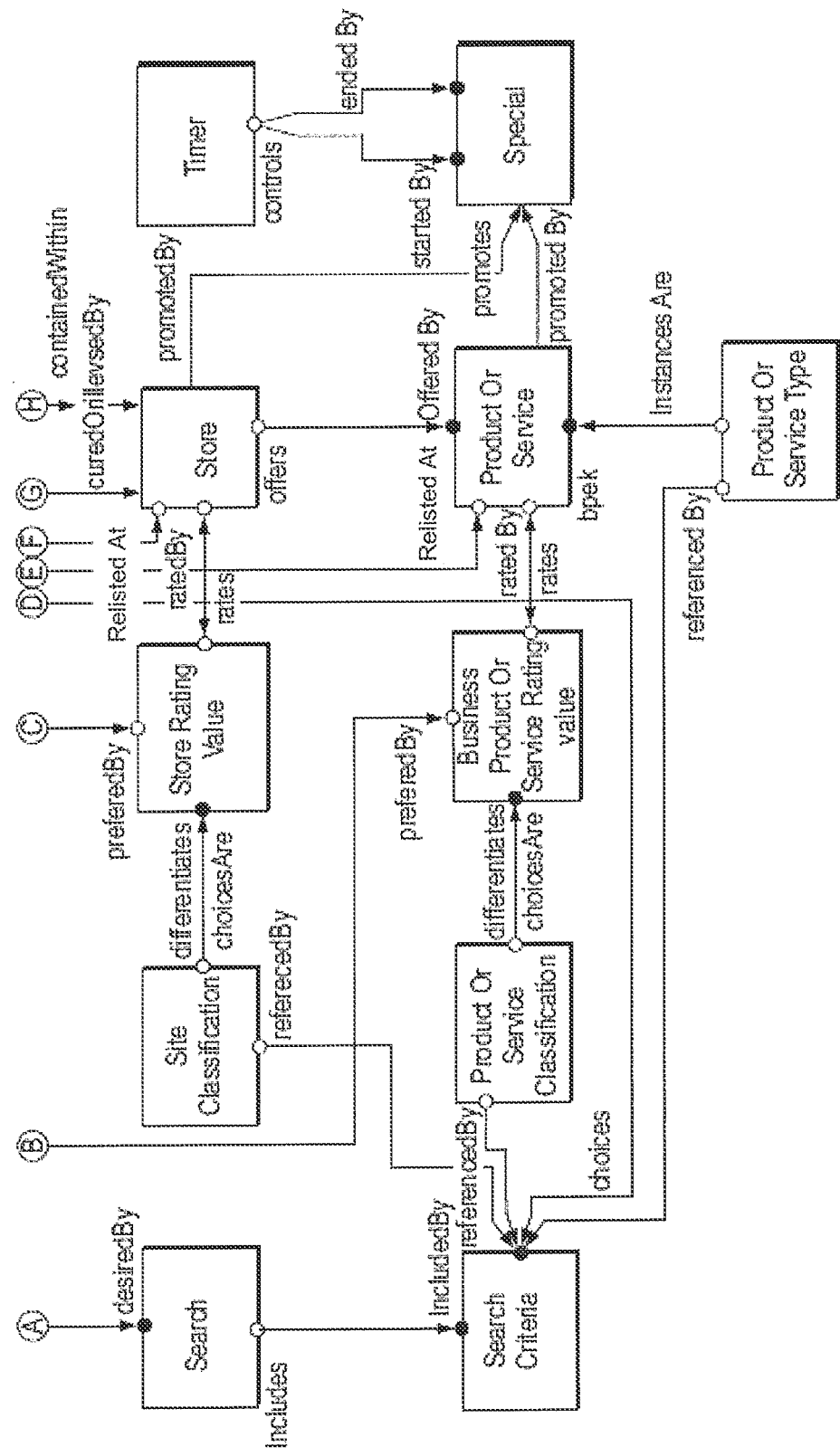

Members of each class (i.e., providers and consumers) may be grouped into subclasses based on additional criteria. Sub classifying may be either independent, relationship-based or some combination thereof. An example of relationship-based sub classifying is a hierarchical approach, but subclasses may be related in some other manner. In contrast, if a subclass is independent, it has no particular relationship to any other subclass within its class. Generally, a provider seeks to be linked to consumers in search of the provider's products or services. Similarly, a consumer seeks to be linked to providers that provide the products or services that the consumer desires. In some situations a provider may be a consumer, for example, in a business-to-business transaction. FIGS. 1-10B depict the entities and relationships of the preferred embodiment of the collaborative linking system.

The collaborative linking system of the preferred embodiment implements a structure that defines a first level of criteria for linking providers and consumers. In an e-commerce context, recognition that most people shop in their immediate vicinity for many products and services, such as for perishables, items or services they need in a relatively short time, and items they prefer to inspect before purchasing, leads to a preference for a geography-based framework or structure. Therefore, consumers and providers are linked, at a first level, in relation to a predetermined geographic region. For the most part, the provider's choice of geographic preference is more or less static, over a period of time, because of the general "bricks and mortar" aspect of providing products and services from a physical location. On the other hand, the consumer has greater physical mobility, so the collaborative linking system provides the capability to allow the consumer to dynamically specify his current geographic point of interest.

Figure 11A:
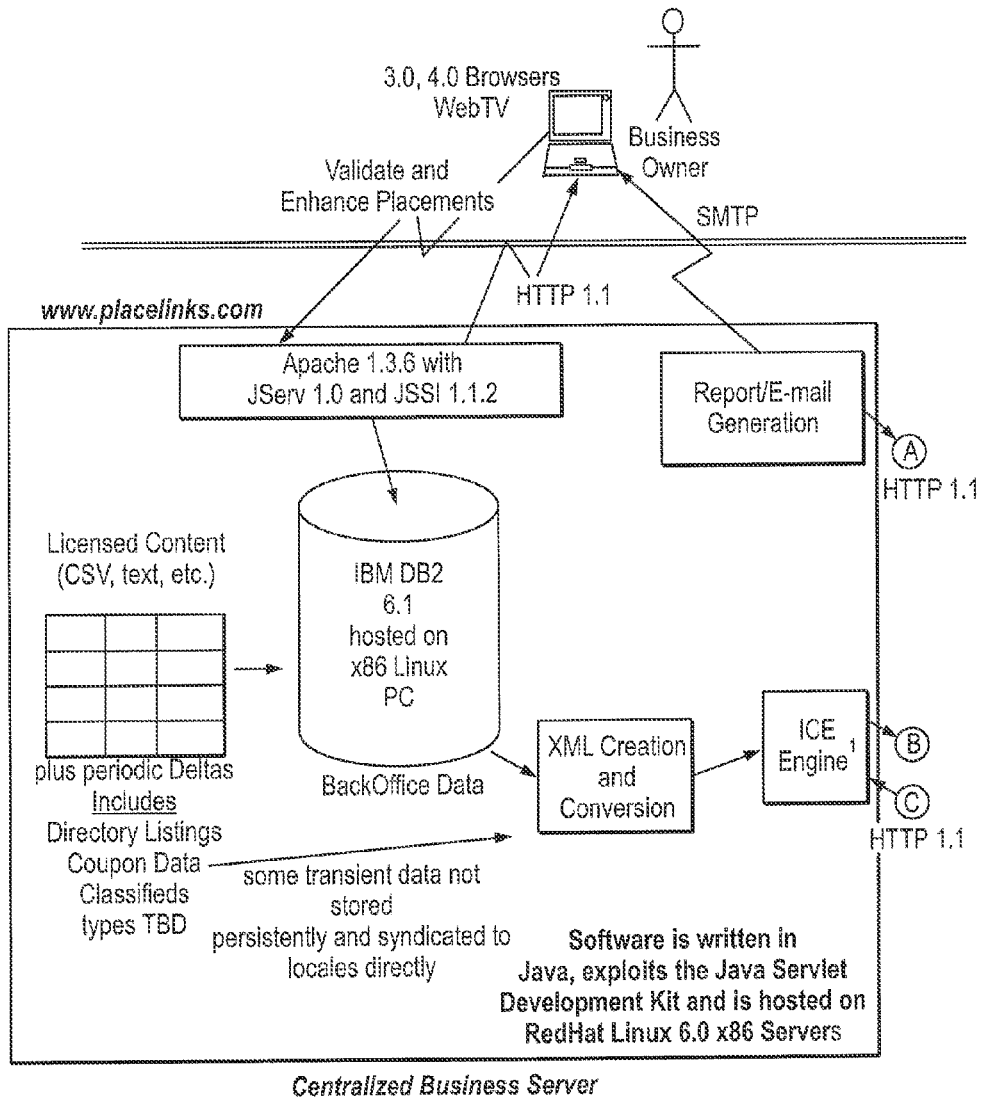
FIGS. 11A-16 are architecture-based diagrams of portions of the collaborative linking system of FIGS. 1-10.
Figure 11B:
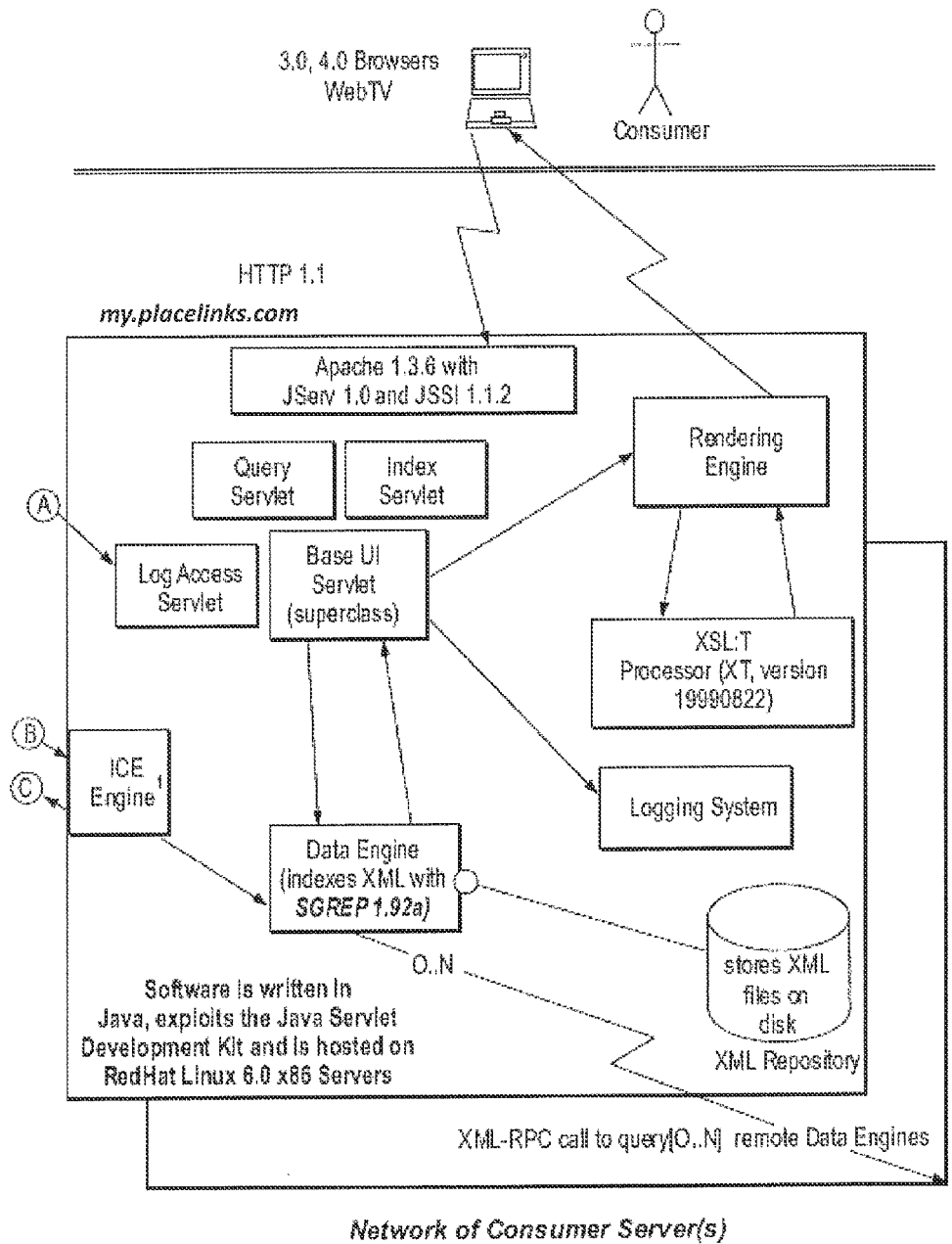
Figure 12A:
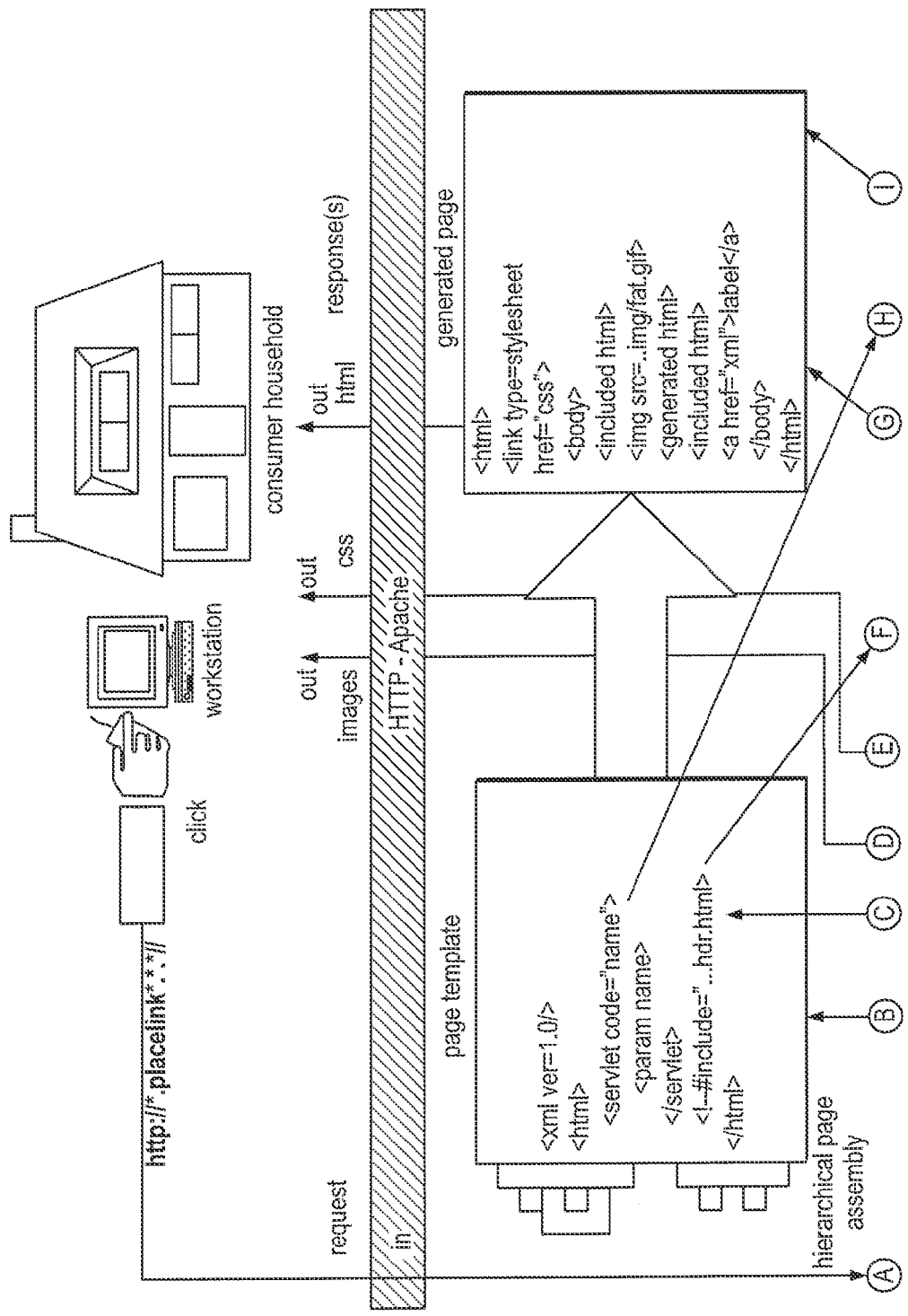
Figure 12B:
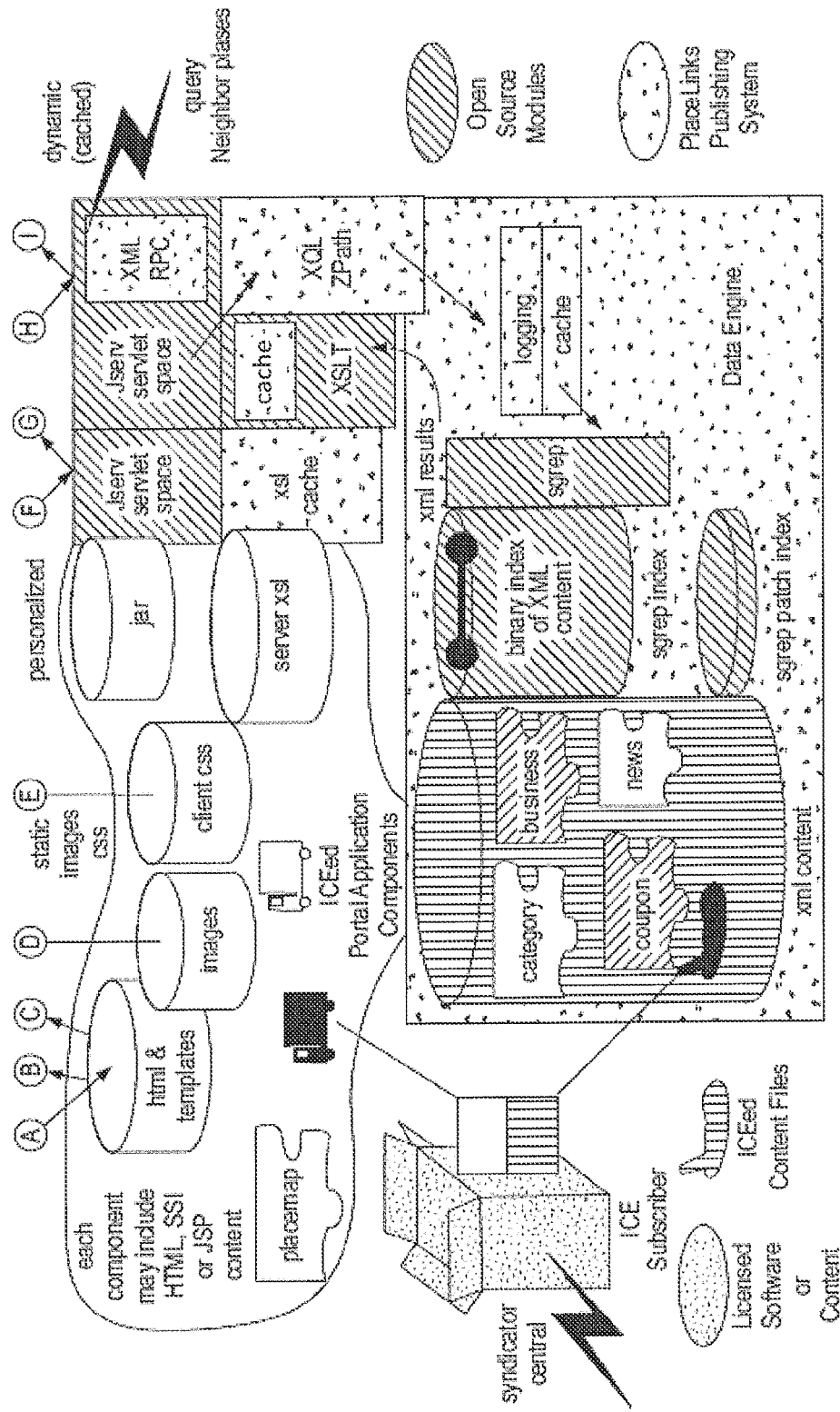
Figure 13A:
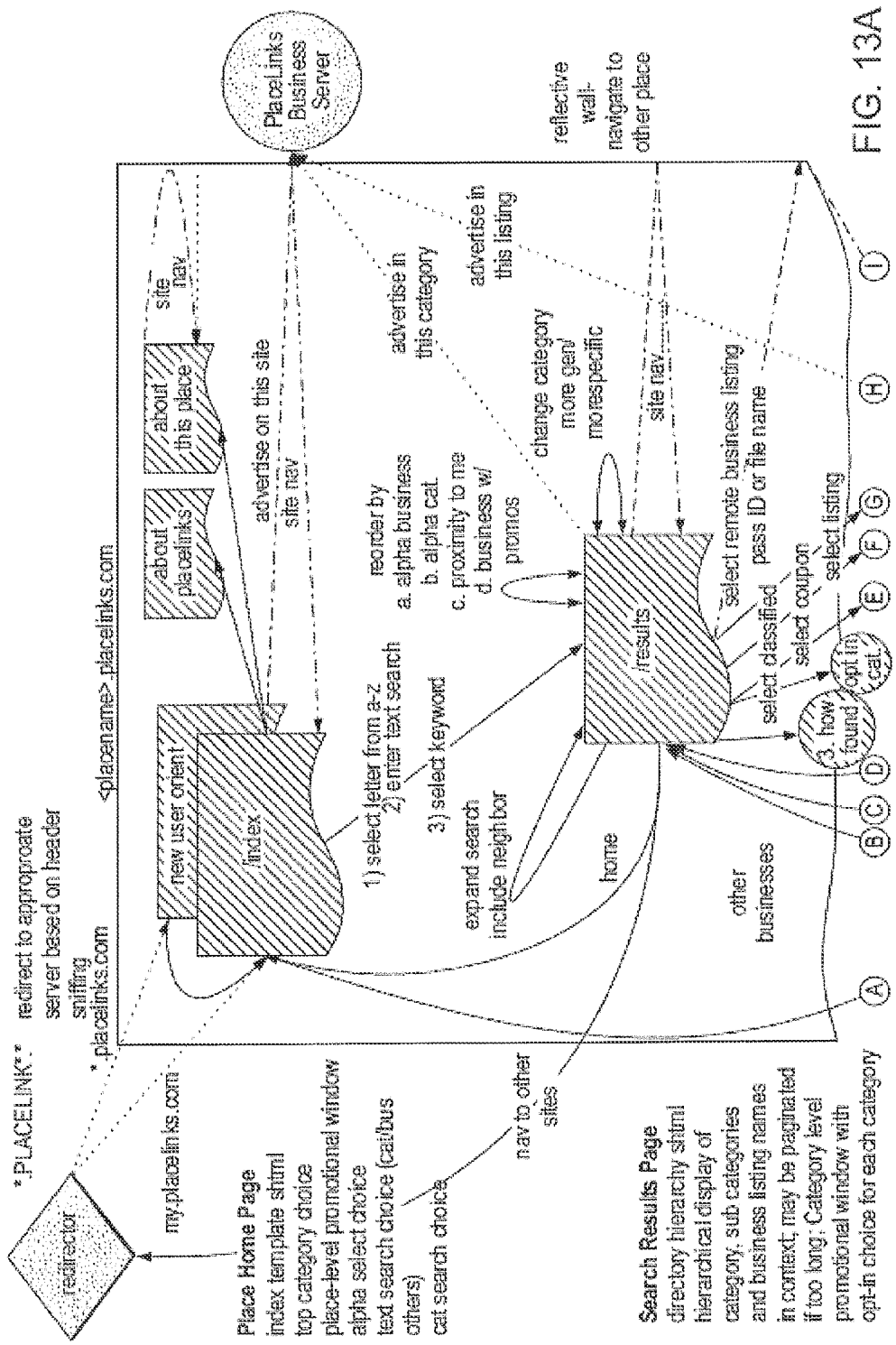
Figure 13B:
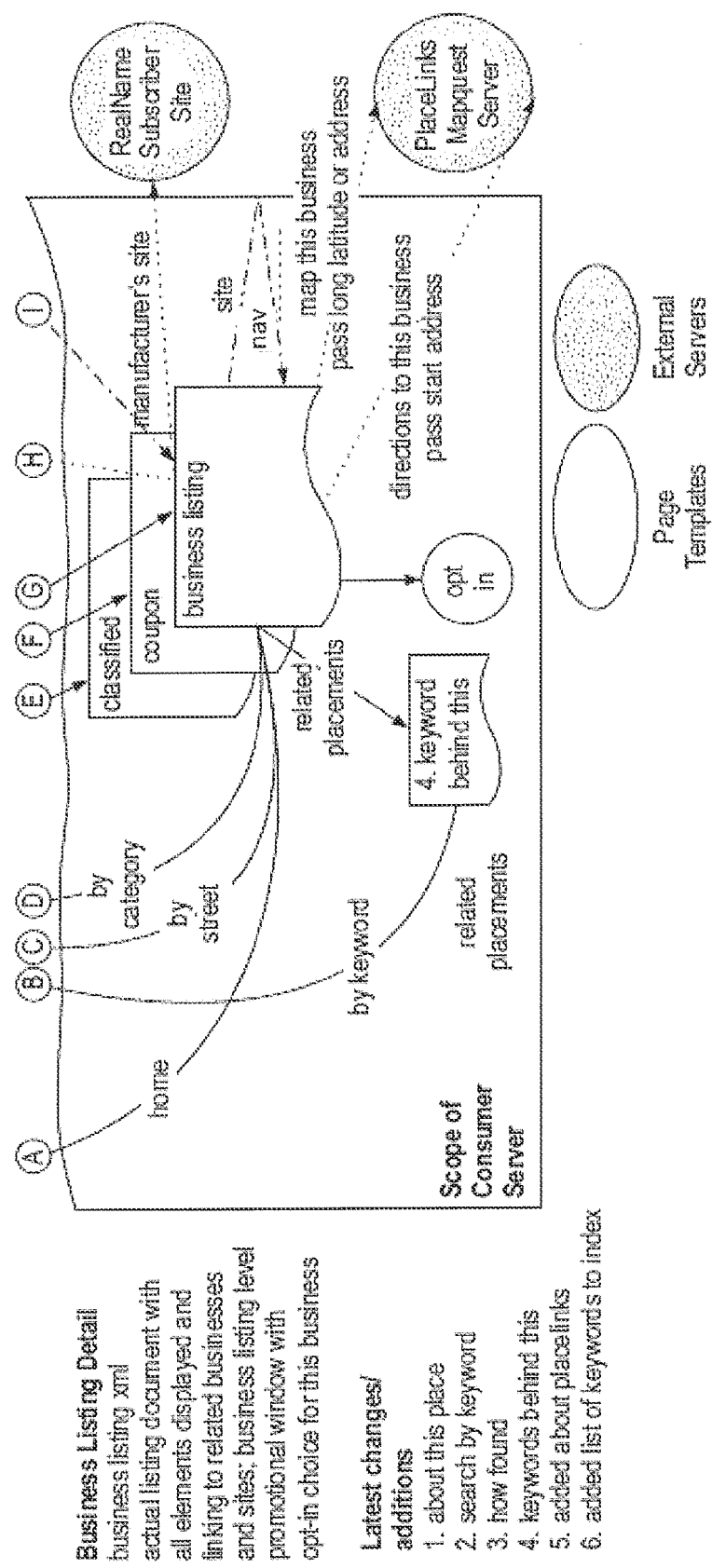
Figure 14:
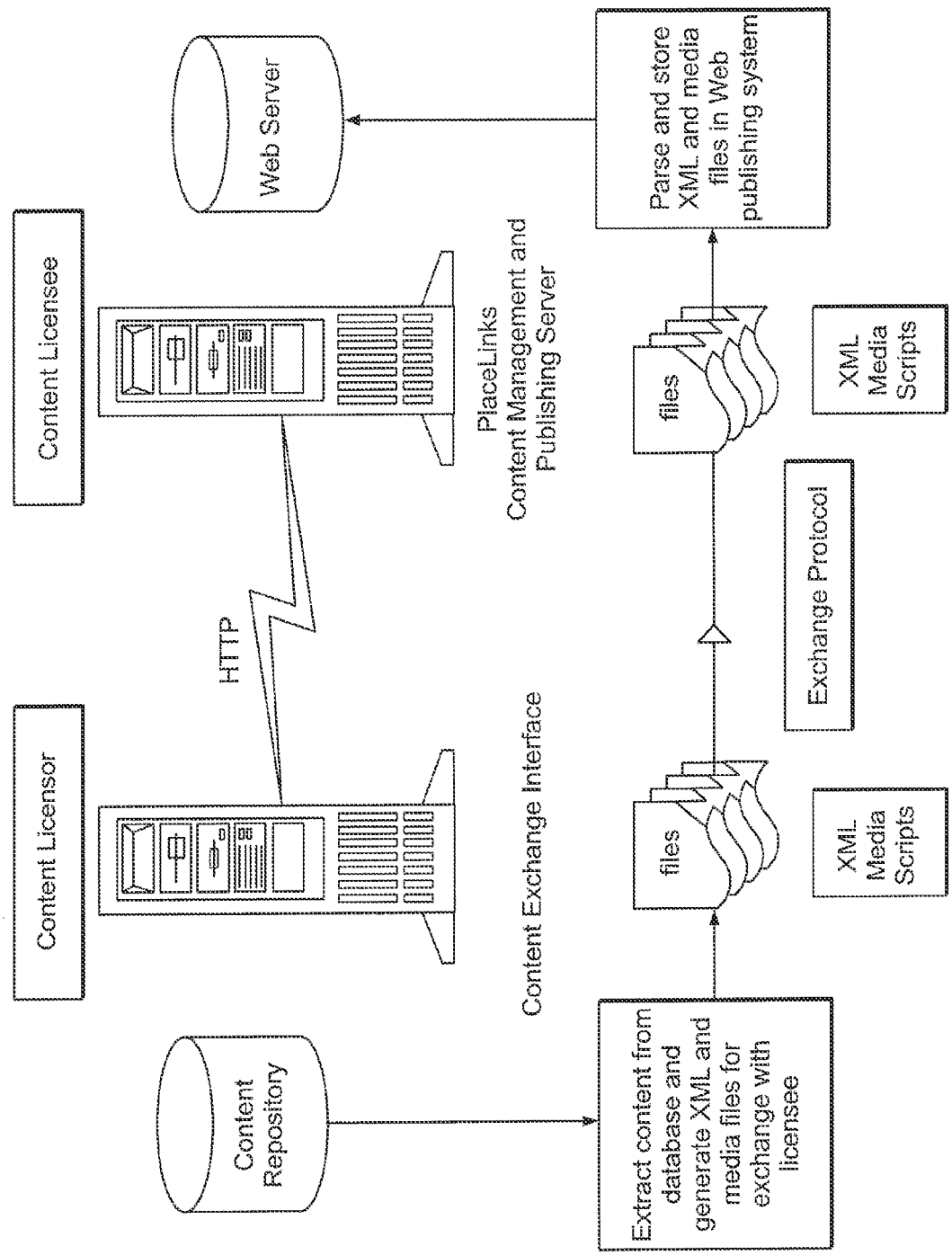
Figure 15:
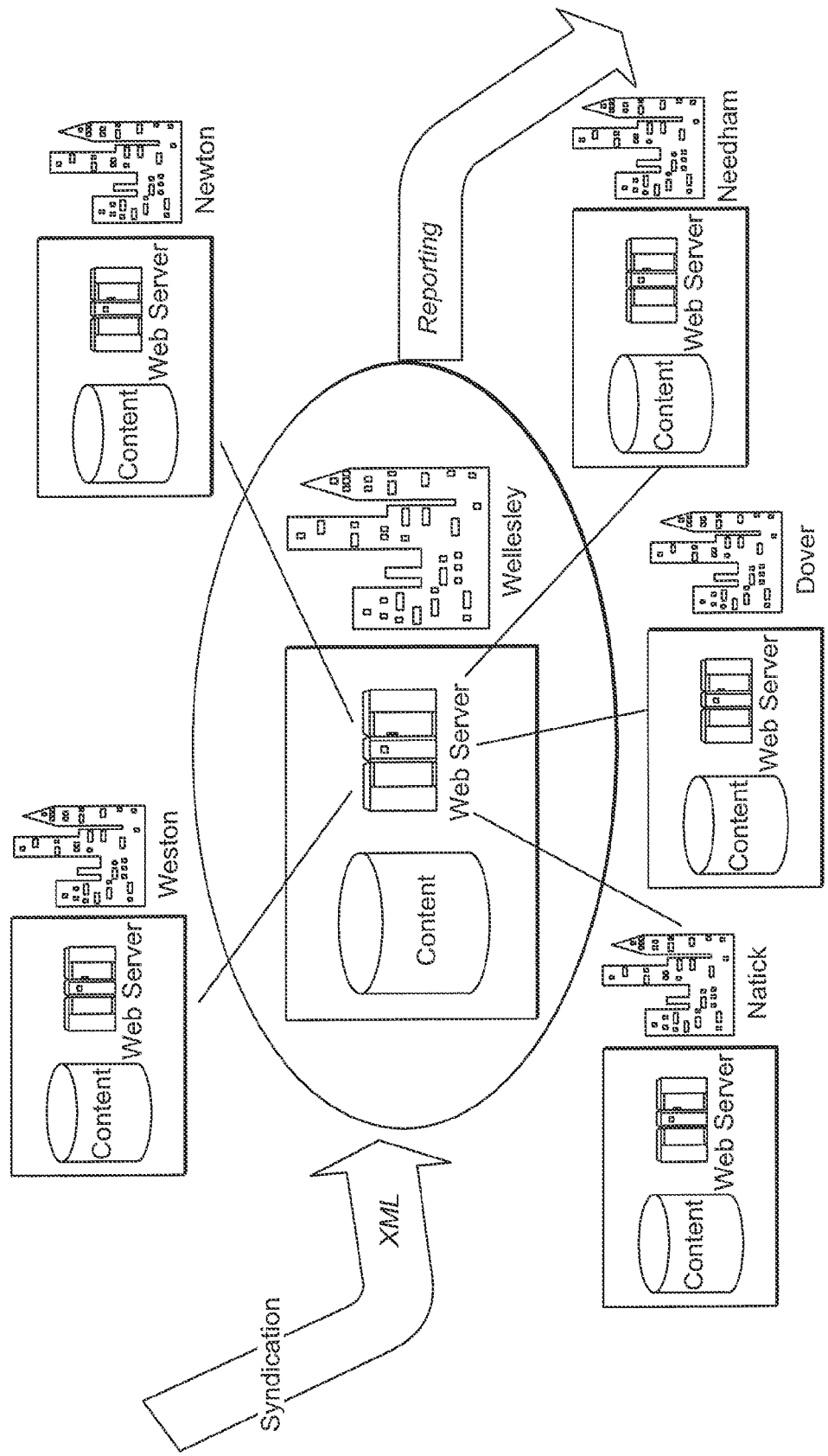
Figure 16:
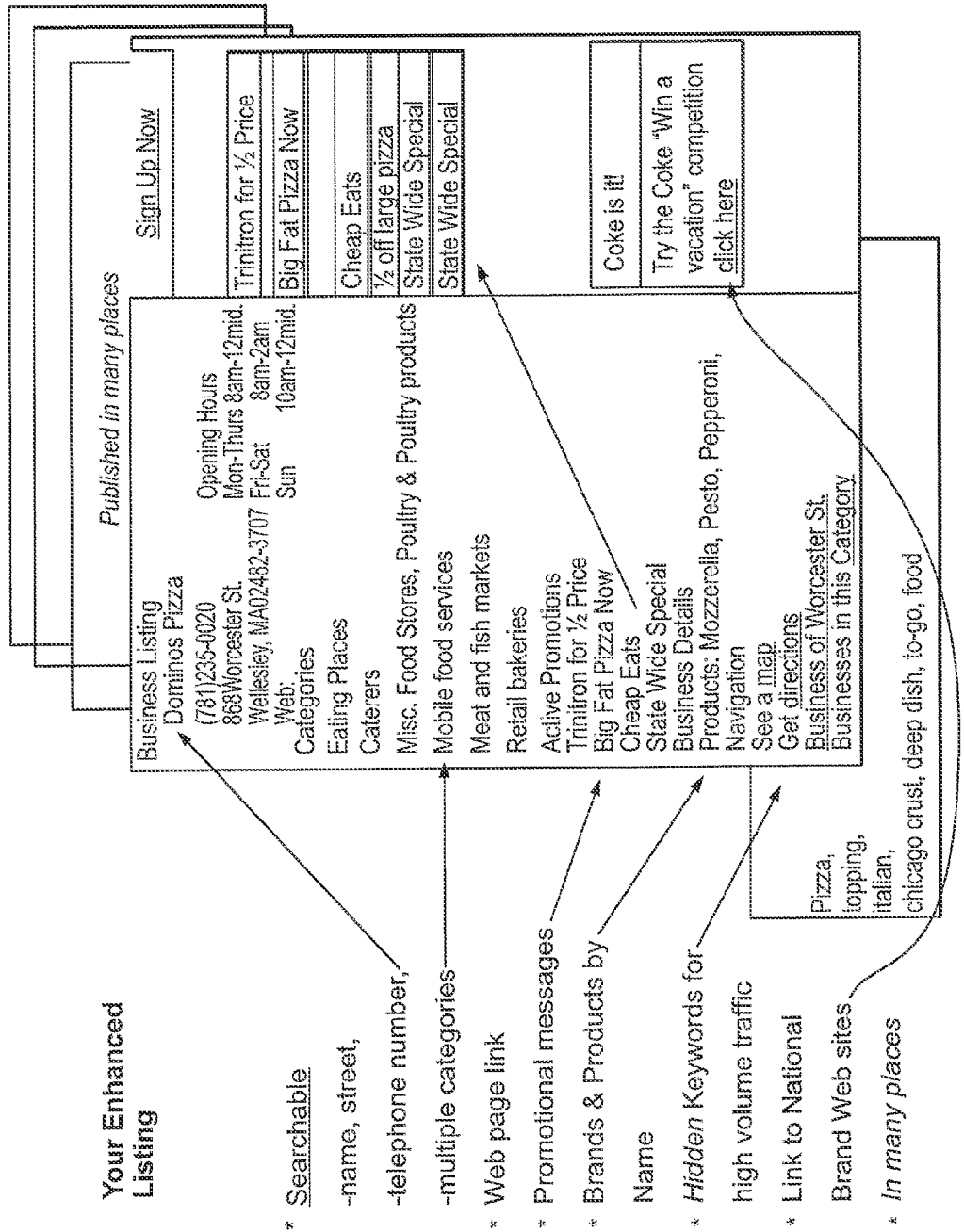

As an architectural implementation, a plurality of content servers and associated content databases are linked together under the general management of a control center and made accessible via the Internet and Web, as shown in FIGS. 11A-16. Additionally, third party databases, information sources (and related functional code), functionality, networks, and systems may be linked to, or imported into, the collaborative linking system, such as databases including directory listings, maps, SIC codes, ZIP codes, telephone exchange numbers, directions for how to get from one place to another, credit information, financial account information and so forth. The content servers and databases are defined according to a geographic region, within the larger geography-based framework. Each provider maps its provider information into those geographical content servers and databases (i.e., "business places") that correspond to that provider's consumer base and/or that provider's storefront locations. A consumer searching for a particular product or service dynamically chooses a geographic region within which to search, that is, the consumer chooses a certain one or more content servers and databases. Preferably the content servers are physically located proximate to or within the geographic region that they serve. This geography-based architecture imposed on providers and consumers provides at least two performance benefits. First, if the consumer is searching a content server and database that is in or near his geographic location, transmission times between the consumer and the content server will be relatively short, due to fewer relays in the transmission path, among other things. Second, the server's response time (to the consumer's search request) will be relatively short, since the content database being searched contains only the data for that geographic region. Also, the more refined the consumer's search, the faster the search results are presented. Of course, in other embodiments, a geography-based structure need not be imposed; the choice of structure is made in light of several considerations and will vary depending on the application for which the collaborative linking system is used. Generally, the structure is chosen to enhance or optimize performance. In other architectures, content servers and databases may be dynamically allocated as a function of the availability of system resources.

A geographic region may be defined in any of a variety of manners, such as, for example, by postal codes, by telephone area codes and exchanges, by a circle defined by longitude and latitude values, by a set of points each with a longitude and latitude value, by governmental census tracks identifiers, or by a set of other geographic regions (places). The provider information (or data) may include information relating to the provider's location (e.g., the store's address), store hours, products and services offered and current promotions. The product information may include make, model, features, price, and quantity on hand. Additionally, providers may be rated and consumers may search for providers meeting a certain minimum rating threshold, for a given product of service.

While a user is most likely to inquire about providers in his geographic region, the user may optionally expand his search to include adjacent geographic regions or to search in remote geographic regions. Additionally, consumers may generally be willing to travel farther within their general geographic area for some products than for others. For example, the geographic region (or business place) for auto dealerships may be larger (in the consumer's mind) than the geographic region for pizza parlors. Thus, a provider may wish to list a particular place of business (e.g., an auto dealership) in multiple surrounding areas. Using the Internet and Web as a communications network, a consumer may seamlessly transition between business places, expand or contract a search, or change the product/service being searched.

In a broad context, the collaborative linking system is implemented for a large group of business places (i.e., towns), wherein each business place includes a plurality of businesses (or providers) offering products and services. A combination of business places may form a higher level business place. For example, a large geographic region may be the United States ("U.S."), which may include a plurality of separate business places (or geographic sub-regions). A provider that has a presence (e.g., store or franchise) in many locations throughout the U.S. may then pick and choose within which business places to advertise each store. Presumably, the provider advertises in those regions where the provider has a physical presence. Additionally, a provider may pick and choose within which business places certain products will be promoted. For example, a department store provider may, in the month of January, promote snow scrapers in Massachusetts and sun glasses in Florida, but not vice versa. However, if the provider is a mail order business with no traditional storefronts, that provider may chose to advertise only in business places having consumers that have demonstrated a demand for the provider's mail order products or may advertise in all business places.

In the preferred embodiment, the collaborative linking system includes the control center, having access to the control servers and control databases. The control center accomplishes the system administration, management, maintenance, modifications, upgrades, and so forth of the collaborative linking system, as well as establishing the basic framework of the system. The control center provides a mechanism for the storage and subsequent mapping of provider data into business places (i.e., business place content servers and databases) and administration of links to third parties (e.g., provider Web sites or third party databases or services). Although, third parties need not link to the collaborative linking system through the control center; they may link to a proximate content server. In the preferred embodiment, providers seeking to offer promotions (e.g., advertise sales or distribute coupons), derive or collect consumer information or derive other benefits beyond a static listing from the collaborative linking system are referred to as "syndicators", and derive such benefits by establishing an account that is managed through the control center. Other providers may simply have their static information (e.g., non-promotional information) provided to consumers.

The collaborative linking system provides a mechanism for providers to use consumer information to tailor or otherwise influence their marketing approach. For example, geographically related consumer information may be added into the system, such as average household income, number of homeowners, political and religious affiliations and other census information, and so on for a geographic region. Additionally, other consumer related information (e.g., number of "hits", consumer preferences, and consumer activity patterns) may be collected by the system, as part of consumer's use of the collaborative linking system. This information may then be used by providers in determining which products and specials are to be offered in a given geographic region, which types of ads are most effective, and which ads are most effective relative to the time of day, among other things. Use of this information may be by overt provider selection, or as an automated function of the application of automated filters. For example, a kitchen appliance company may only promote certain appliances in the towns where the company has a distributor and where new home construction is higher than 5%. Once a town's new home sales drop below 5%, the collaborative linking system may automatically cease promotions on those appliances in that town.

In the preferred embodiment, the collaborative linking system user interface is comprised of at least three user-type interfaces: a system administrator user interface (SAUI), a provider user interface (PUI), and a consumer user interface (CUI). That is, the SAUI includes a plurality of displays useful by system administrator personnel for monitoring, data gathering, troubleshooting, analyzing, modifying, upgrading, configuring, enhancing, testing, and otherwise operating and maintaining the collaborative linking systems and the information thereon. The SAUI may also be used for billing and account management purposes. Also, the SAUI may be used to add, modify, and delete provider and consumer data and to establish and maintain links to third party systems and databases. Access to certain aspects of the collaborative linking system for system administration purposes may vary as a function of predetermined user privileges. For the most part, system administration is conducted via the control center.

The PUI allows a provider to access information related to that provider on the collaborative linking system. In the preferred form, the collaborative linking system databases are populated with relatively static provider data within a geographic context for substantially each provider in a selected business place. As previously discussed, such relatively static provider data typically includes a provider name, address, and telephone number (which may collectively be referred to as a "listing"). Such information is entered into the system via the SAUI or by the provider via the PUI. Using the PUI, a provider may "register" with or establish an account on the collaborative linking system and subsequently view, add, delete, or modify its provider data. Registered providers are required to logon to the collaborative linking system in order to interact with their provider data. Using the PUI, for example, a provider may define promotional specials, change or update provider data and view statistical information related to their listing and specials. Appendix A (and its figures), attached hereto and incorporated herein by reference in its entirety, describes an embodiment of the PUI.

For the consumer, the collaborative linking system CUI provides, preferably, a hierarchical, link or text-based search approach to finding providers relative to a chosen geographical region, as a first level criterion. Decreasing recall and increasing accuracy of results is achieved with the addition of subsequent criteria by the consumer, as indicated in the CUI screen prints of FIGS. 17-24. In the preferred embodiment, the consumer interacts with the collaborative linking system via a standard Web browser. The consumer may directly access a business place Web site, associated with a particular business place (e.g., the town of Wellesley, Mass.) to find providers in that business place. Additionally, the consumer may broaden the search to include other business places or migrate to other business places. As a function of the user's search, the collaborative linking system generates and displays within the CUI provider information and data, and may additionally provide information about companion providers or promotions. For example, if a consumer searches for pizza places in Wellesley, Mass., the CUI may provide a list of all pizza places in that town. Additionally, the user interface may provide indications of specials or promotions offered by certain providers (e.g., icons, conspicuous text, and/or sound messages). Also, as a function of the consumer's search, companion specials or promotions may also be included within the CUI, for example, a promotion by a local convenience store on soft drinks. Additionally, provider specials and promotions may provide virtual links to the provider's own Internet pages.

Additionally, a consumer's interests or other consumer information may be registered with the collaborative linking system. In such a case, a consumer may be linked (or matched) with providers as part of an "opt-in" service, as a function of a synergy between the consumer and the providers. For example, the consumer's interests may correspond to one or more provider's offers; consequently, the consumers and providers are linked by the collaborative linking system. Preferably, the collaborative linking system maintains the anonymity of the consumer with respect to the provider when linking the two. Further aspects of this service may be better understood and appreciated in the context of the embodiment described in Appendix B attached hereto and incorporated herein by reference in its entirety.

As will be appreciated by those skilled in the art, the various UIs may vary, depending on the type of computer or electronic device with which they are to be used. For example, the CUI for a PC may differ from the CUI for a cell phone, and so on. Additionally, the various UIs may be defined in other manners without departing from the present invention.

The invention may be embodied in other specific forms without departing from the spirit or central characteristics thereof. For example, mapping of provider information may be dynamically accomplished and editable. Also, automated filters may be applied to effect the dynamic mapping of provider information. Additionally, third party databases may be linked into the collaborative linking system and used by providers to select consumers or by consumers to select providers. In other embodiments, the definition of the geographic regions may vary as a function of the product or service being searched, rather than be relatively statically defined. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

The invention claimed is:

1. A computerized method to establish by a collaborative linking system, a relationship with one or more consumers, whereby e-mail deals are provided by the collaborative linking system to the one or more consumers over Internet, comprising steps of:

by the collaborative linking system:
  A. assembling one or more e-mail deals, wherein each e-mail deal is representative of:
    i. an offer by at least one provider of at least one product or service in return for an associated consideration to the at least one provider, wherein at least one of the at least one product or service is associated with one or more product/service attributes,
  B. generating over the Internet, an offer to provide the one or more e-mail deals to the one or more consumers by posting a sign-up form for each of the one or more consumers including:
    i. an offer to provide in the future, one or more e-mail deals to the one or more consumers,
    ii. one or more queries on product/service attribute preferences of the one or more consumers with respect to one or more product/service attributes of the at least one product or service,
    iii. one or more queries on consumer personal attributes of the one or more consumers,
  C. receiving over the Internet, a consumer reply message from at least one of the one or more consumers responsive to posting of the sign-up form, and indicative of acceptance by the at least one of the one or more consumers of the offer to provide the one or more e-mail deals,
  D. receiving over the Internet,
    i. a consumer product/service attribute message from the at least one of the one or more consumers, wherein the received consumer product/service attribute message includes at least one query response by the at least one of the one or more consumers to one or more of the queries on one or more product/service attribute preferences of the at least one of the one or more consumers, wherein the at least one query response is indicative of one or more consumer-generated keywords indicative of at least one of the one or more product/service attribute preferences of the at least one of the one or more consumers, and
    ii. a consumer personal attribute message from the at least one of the one or more consumers, wherein the consumer personal attribute message includes one or more query responses by the at least one of the one or more consumers to the one or more queries on consumer personal attributes,
  E. correlating (i) at least one of the at least one query response indicative of one or more consumer-generated keywords indicative of product/service attribute preferences of a consumer from the at least one of the one or more consumers with (ii) at least one of the product/service attributes of the at least one product or service of one or more of the one or more e-mail deals, to identify one or more of the one or more e-mail deals as being appropriate email deals for the consumer, and
  F. sending over the Internet to the at least one of the one or more consumers a message representative of at least one of the one or more appropriate e-mail deals.

2. The method of claim 1, comprising further step of:
by the collaborative linking system:
  in response to receipt of the sign-up forms from the one or more consumers which are indicative of acceptance from one or more consumers, monitoring behavior of the acceptance consumers regarding activity relating to notice of the one or more email deals sent thereto by way of the collaborative linking system.

3. The method of claim 2, wherein the monitoring step includes: monitoring for click-through actions taken by one or more of the one or more consumers.

4. The method of claim 2, wherein the monitoring step includes: monitoring for a request by one or more of the one or more consumers, for a map or directions to at least one provider of one or more of the one or more of the at least one product or service.

5. The method of claim 2, wherein the monitoring step includes: monitoring for a request by one or more of the one or more consumers, for a search of one or more neighboring towns for a provider of one or more of the at least one product or service.

6. The method of claim 2, wherein the monitoring step includes: monitoring for a request by one or more of the one or more consumers, for a search to identify one or more additional providers of one or more of the at least one product or service.

7. The method of claim 2, wherein the monitoring step includes: monitoring for a request by one or more of the one or more consumers, for modifying one or more of the at least one product or service, or the one or more product/service attribute preferences relating thereto, associated with one or more of the ones of the one or more consumers.

8. The method of claim 2, wherein the monitoring step includes: monitoring for a request by one or more of the one or more consumers, for customer service.

9. The method of claim 2, wherein the monitoring step includes: monitoring for an unsubscribe request by one or more of the one or more consumers.

10. The method of claim 1, wherein the query responses of at least one consumer product/service attribute message includes information representative of at least one member of a product/service attribute set.

11. The method of claim 10, wherein the at least one member of the product/service attribute set is a product/service descriptor.

12. The method of claim 10, wherein the at least one member of the product/service attribute set is a product/service brand.

13. The method of claim 10, wherein the at least one member of the product/service attribute set is an identifier of a provider of at least one of the at least one product or service.

14. The method of claim 10, wherein the at least one member of the product/service attribute set is a geographic location of a provider of at least one of the at least one product or service.

15. The method of claim 10, wherein the at least one member of the product/service attribute set is a nominal gender associated with a likely user of at least one of the at least one product or service.

16. The method of claim 10, wherein the at least one member of the product/service attribute set is a nominal age range associated with a likely user of at least one of the at least one product or service.

17. The method of claim 10, wherein the at least one member of the consumer personal attribute set is an identifier of a preferred provider of at least one of the at least one product or service.

18. The method of claim 1, wherein the consumer personal attributes include information representative of at least one member of a consumer personal attribute set.

19. The method of claim 18, wherein the at least one member of the consumer personal attribute set is a preferred product/service descriptor.

20. The method of claim 18, wherein the at least one member of the consumer personal attribute set is a preferred product/service brand.

21. The method of claim 18, wherein the at least one member of the consumer personal attribute set is a preferred geographic location of a provider of at least one of the at least one product or service.

22. The method of claim 18, wherein the at least one member of the consumer personal attribute set is gender of one of the one or more consumers associated with the consumer personal attribute set.

23. The method of claim 18, wherein the at least one member of the consumer personal attribute set is a preferred age range associated with at least one of the at least one product or service.

24. The method of claim 18, wherein the correlating step E further includes a sub-step of:
by the collaborative linking system:
identifying as an appropriate email deal for one of the one or more consumers, one or more of the one or more email deals for which one or more of the associated consumer personal attributes of at least one query response received from the one or more consumers, matches at least one member of the consumer personal attribute set for the one or more consumers.

25. The method of claim 1, wherein the offer to provide the one or more e-mail deals to one of the one or more consumers by posting a sign-up form of step B, further includes:
one or more queries on consumer interest/activity attribute preferences of the one of the one or more consumers.

26. The method of claim 25, comprising a further step of:
by the collaborative linking system:
receiving over the Internet, a consumer interest/activity attribute message from the one of the one or more consumers, wherein the consumer interest/activity attribute message includes one or more query responses by the one of the one or more consumers to one or more of the queries on consumer interest/activity attribute preferences.

27. The method of claim 26, wherein the one or more query responses of at least one consumer interest/activity message includes information representative of at least one member of a consumer interest/activity attribute set.

28. The method of claim 27, wherein the at least one member of the consumer interest/activity attribute set is an activity descriptor.

29. The method of claim 27, wherein the at least one member of the consumer interest/activity attribute set is an interest descriptor.

30. The method of claim 27, wherein the correlating step E further includes a sub-step of:
by the collaborative linking system:
identifying as an appropriate email deal for one of the one or more consumers, one or more of the one or more email deals for which one or more of the associated consumer interest/activity attributes of at least one query response received from the one or more consumers, matches at least one member of the consumer interest/activity attribute set for the one or more consumers.

* * * * *